United States Patent
Bourdev et al.

(10) Patent No.: US 10,565,499 B2
(45) Date of Patent: Feb. 18, 2020

(54) AUTOENCODING IMAGE RESIDUALS FOR IMPROVING UPSAMPLED IMAGES

(71) Applicant: WaveOne Inc., Mountain View, CA (US)

(72) Inventors: Lubomir Bourdev, Mountain View, CA (US); Carissa Lew, San Jose, CA (US); Sanjay Nair, Fremont, CA (US); Oren Rippel, Mountain View, CA (US)

(73) Assignee: WaveOne Inc., Mountain View, CA (US)

( * ) Notice: Subject to any disclaimer, the term of this patent is extended or adjusted under 35 U.S.C. 154(b) by 132 days.

(21) Appl. No.: 15/844,452

(22) Filed: Dec. 15, 2017

(65) Prior Publication Data

US 2018/0174275 A1 Jun. 21, 2018

Related U.S. Application Data

(60) Provisional application No. 62/434,600, filed on Dec. 15, 2016, provisional application No. 62/434,602, (Continued)

(51) Int. Cl.
*G06N 3/08* (2006.01)
*G06N 3/04* (2006.01)
(Continued)

(52) U.S. Cl.
CPC ........... *G06N 3/08* (2013.01); *G06K 9/00288* (2013.01); *G06K 9/00744* (2013.01); (Continued)

(58) Field of Classification Search
CPC .... H04N 19/126; H04N 19/13; H04N 19/149; H04N 19/154; H04N 19/167; (Continued)

(56) References Cited

U.S. PATENT DOCUMENTS

2014/0132429 A1* 5/2014 Scoville ................. H03M 7/30 341/87
2017/0285123 A1* 10/2017 Kaditz ............... G01R 33/5608
(Continued)

OTHER PUBLICATIONS

Antonini, M. et al., "Image Coding Using Wavelet Transform," IEEE Transactions on Image Processing, Apr. 1992, pp. 205-220, vol. 1, No. 2.

(Continued)

*Primary Examiner* — Jonathan S Lee
(74) *Attorney, Agent, or Firm* — Fenwick & West LLP

(57) ABSTRACT

An enhanced encoder system generates residual bitstreams representing additional image information that can be used by an image enhancement system to improve a low quality image. The enhanced encoder system upsamples a low quality image and compares the upsampled image to a true high quality image to determine image inaccuracies that arise due to the upsampling process. The enhanced encoder system encodes the information describing the image inaccuracies using a trained encoder model as the residual bitstream. The image enhancement system upsamples the same low quality image to obtain a prediction of a high quality image that can include image inaccuracies. Given the residual bitstream, the image enhancement system decodes the residual bitstream using a trained decoder model and uses the additional image information to improve the predicted high quality image. The image enhancement system can provide an improved, high quality image for display.

28 Claims, 11 Drawing Sheets

Related U.S. Application Data filed on Dec. 15, 2016, provisional application No. 62/434,603, filed on Dec. 15, 2016, provisional application No. 62/458,749, filed on Feb. 14, 2017.

(51) Int. Cl.

| | |
|---|---|
| G06N 20/00 | (2019.01) |
| G06K 9/00 | (2006.01) |
| G06K 9/62 | (2006.01) |
| G06K 9/46 | (2006.01) |
| H04N 19/126 | (2014.01) |
| H04N 19/167 | (2014.01) |
| H04N 19/172 | (2014.01) |
| H04N 19/196 | (2014.01) |
| H04N 19/91 | (2014.01) |
| H04N 19/44 | (2014.01) |
| G06K 9/66 | (2006.01) |
| G06T 5/00 | (2006.01) |
| H04N 19/13 | (2014.01) |
| H04N 19/149 | (2014.01) |
| H04N 19/18 | (2014.01) |
| H04N 19/48 | (2014.01) |
| H04N 19/154 | (2014.01) |
| H04N 19/33 | (2014.01) |

(52) U.S. Cl.
CPC ....... *G06K 9/00771* (2013.01); *G06K 9/4619* (2013.01); *G06K 9/4628* (2013.01); *G06K 9/6212* (2013.01); *G06K 9/6232* (2013.01); *G06K 9/6256* (2013.01); *G06K 9/6263* (2013.01); *G06K 9/6274* (2013.01); *G06K 9/66* (2013.01); *G06N 3/04* (2013.01); *G06N 3/0454* (2013.01); *G06N 3/084* (2013.01); *G06N 20/00* (2019.01); *G06T 5/002* (2013.01); *H04N 19/126* (2014.11); *H04N 19/13* (2014.11); *H04N 19/149* (2014.11); *H04N 19/154* (2014.11); *H04N 19/167* (2014.11); *H04N 19/172* (2014.11); *H04N 19/18* (2014.11); *H04N 19/197* (2014.11); *H04N 19/33* (2014.11); *H04N 19/44* (2014.11); *H04N 19/48* (2014.11); *H04N 19/91* (2014.11); *G06K 2209/01* (2013.01)

(58) Field of Classification Search
CPC .... H04N 19/172; H04N 19/18; H04N 19/197; H04N 19/33; H04N 19/44; H04N 19/48; H04N 19/91; G06N 20/00; G06N 3/04; G06N 3/084; G06K 9/00288; G06K 9/00744; G06K 9/00771; G06K 9/4619; G06K 9/4628; G06K 9/6212; G06K 9/6232; G06K 9/6256; G06K 9/6263; G06K 9/6274; G06K 9/66; G06T 5/002
USPC ......................................................... 382/157
See application file for complete search history.

(56) References Cited

U.S. PATENT DOCUMENTS

| | | | | |
|---|---|---|---|---|
| 2017/0347110 | A1* | 11/2017 | Wang | G06T 3/4046 |
| 2018/0277068 | A1* | 9/2018 | Diederich | G09G 5/39 |
| 2018/0293711 | A1* | 10/2018 | Vogels | G06K 9/40 |
| 2019/0035101 | A1* | 1/2019 | Kwant | G06T 7/60 |
| 2019/0035113 | A1* | 1/2019 | Salvi | G06N 3/08 |
| 2019/0171936 | A1* | 6/2019 | Karras | G06N 3/08 |

OTHER PUBLICATIONS

Balle, J. et al., "End-to-End Optimized Image Compression," ICLR 2017, Mar. 3, 2017, pp. 1-27.
Balle, J. et al., "Variational Image Compression with a Scale Hyperprior," ICLR 2018, May 1, 2018, pp. 1-23.
Bottou, L. et al., "High Quality Document Image Compression with "DjVu,"," Journal of Electronic Imaging, Jul. 1998, pp. 410-4258, vol. 7, No. 3.
Dang-Nguyen, D.-T. et al., "RAISE: A Raw Images Dataset for Digital Image Forensics," In Proceedings of the 6th ACM Multimedia Systems Conference, ACM, 2015, MMSys'15, Mar. 18-20, 2015, pp. 219-224.
Denton, E. L. et al., "Deep Generative Image Models Using a Laplacian Pyramid of Adversarial Networks," In Advances in Neural Information Processing Systems, Jun. 18, 2015, pp. 1486-1494.
Goodfellow, I. et al., "Generative Adversarial Nets." In Advances in Neural Information Processing Systems, 2014, pp. 2672-2680.
Haffner, P. et al., "DjVu: Analyzing and Compressing Scanned Documents for Internet Distribution," ICDAR 1999, 1999, pp. 1-4.
Hinton, G.E. et al., "Reducing the Dimensionality of Data with Neural Networks," Science, Jul. 28, 2006, pp. 504-507, vol. 313.
Isola, P. et al., "Image-to-Image Translation with Conditional Adversarial Networks," Nov. 22, 2017, pp. 1-17.
Kingma, D. et al., "ADAM: A Method for Stochastic Optimization," ICLR 2015, Jan. 30, 2017, pp. 1-15.
Ledig, C. et al., "Photo-Realistic Single Image Super-Resolution Using a Generative Adversarial Network," Nov. 21, 2016, pp. 1-19.
Mallat, S. G. "A Theory for Multiresolution Signal Decomposition: The Wavelet Representation," IEEE Transactions on Pattern Analysis and Machine Intelligence, Jul. 1989, pp. 674-693, vol. 11, No. 7.
Mathieu, M. et al., "Deep Multi-Scale Video Prediction Beyond Mean Square Error," ICLR 2016, Feb. 26, 2016, pp. 1-14.
Radford, A. et al., "Unsupervised Representation Learning with Deep Convolutional Generative Adversarial Networks," ICLR 2016, Jan. 7, 2016, pp. 1-16.
Rippel, O. et al., "Learning Ordered Representations with Nested Dropout," In International Conference on Machine Learning, Feb. 5, 2014, 11 pages.
Salimans, T. et al., "Improved Techniques for Training GANs," 30th Conference on Neural Information Processing Systems (NIPS 2016), Barcelona, Spain, In Advances in Neural Information Processing Systems, 2016, pp. 2226-2234.
Santurkar, S. et al., "Generative Compression," Jun. 4, 2017, pp. 1-10.
Shi, W. et al., "Real-Time Single Image and Video Super-Resolution Using an Efficient Sub-Pixel Convolutional Neural Network," The IEEE Conference on Computer Vision and Pattern Recognition (CVPR), 2016, pp. 1874-1883.
Theis, L. et al., "Lossy Image Compression with Compressive Autoencoders," ICLR 2017, Mar. 1, 2017, pp. 1-19.
Thomee, B. et al., "YFCC100M: The New Data in Multimedia Research," Communications of the ACM, Feb. 2016, pp. 64-73, vol. 59, No. 2.
Toderici, G. et al., "Full Resolution Image Compression with Recurrent Neural Networks," ICLR 2017, Jul. 7, 2017, pp. 1-9.
Toderici, G. et al., "Variable Rate Image Compression with Recurrent Neural Networks," ICLR 2016, pp. 1-12.
Wallace, G.K., "The JPEG Still Picture Compression Standard," IEEE Transactions on Consumer Electronics, Feb. 1992, pp. xviii-xxxiv, vol. 38, No. 1.
Wang, Z. et al., "Image Quality Assessment: from Error Visibility to Structural Similarity," IEEE Transactions on Image Processing, Apr. 2004, pp. 600-612, vol. 13, No. 4.
Wang, Z. et al., "Multiscale Structural Similarity for Image Quality Assessment," In Conference Record of the Thirty-Seventh Asilomar Conference on Signals, Systems and Computers, 2004., IEEE, Nov. 9-12, 2003, pp. 1398-1402, vol. 2.
Wikipedia: Structural Similarity, Wikipedia.org, Last Edited Mar. 22, 2018, 7 pages, [Online] [Retrieved on Apr. 10, 2018] Retrieved from the Internet<URL:https://en.wikipedia.org/wiki/Structural_similarity>.

* cited by examiner

AUTOENCODING IMAGE RESIDUALS FOR IMPROVING UPSAMPLED IMAGES

CROSS REFERENCE TO RELATED APPLICATIONS

This application claims priority to Provisional U.S. Application No. 62/434,600, filed Dec. 15, 2016, Provisional U.S. Application No. 62/434,602, filed Dec. 15, 2016, Provisional U.S. Application No. 62/434,603, filed Dec. 15, 2016, and Provisional U.S. Application No. 62/458,749, filed Feb. 14, 2017. Each aforementioned provisional application is incorporated herein by reference in its entirety.

BACKGROUND

This invention generally relates to image processing, and more specifically to the improvement of image quality of an image using a machine-learned autoencoder.

It is often desirable to send different versions of the same content to different devices. For example, for devices that are limited by available bandwidth, a lower quality version of a content can be provided whereas for devices that are not constrained by available bandwidth, a higher quality version of the content can be transmitted. A user of the device can consume a version of the content that is best suited for the device.

Conventional systems often upsample lower quality content to generate a higher quality content. For example, conventional systems can employ machine learning models to interpolate additional pixels of a lower quality image. The interpolated pixels can be included in the higher resolution image. However, many of these machine learning models generate upsampled images that suffer from deficiencies such as image artifacts that arise due to the upsampling process. In other words, there can be significant differences between a true, higher resolution image and an upsampled image that is predicted from a low resolution image by a trained machine learning model.

SUMMARY

Systems and devices receive and decode images, such as low quality images. These low quality images can be displayed for user consumption. This can be beneficial in low bandwidth situations. In some scenarios, these systems and devices, hereafter referred to as image enhancement systems, can choose to improve the quality of the low quality images. As an example, an image enhancement system can choose to receive additional image information in situations where bandwidth availability is not a concern. Therefore, a higher quality image can be displayed, which can provide for an improved user experience.

The image enhancement system predicts a higher quality image by upsampling the low quality image. However, the upsampled high quality image, hereafter abbreviated as HQ', can still suffer from image artifacts. The image enhancement system can receive and decode a residual bitstream from an enhanced encoder system that represents additional image information of the HQ' image. The image enhancement system can use the decoded residual bitstream to further improve any deficiencies in the HQ' image. The improved version of the upsampled high quality image is referred to as a predicted high quality image and hereafter abbreviated as HQ" image.

The enhanced encoder system can be a server that analyzes low quality images and high quality images to generate the additional image information (e.g., residual bitstream) that is provided to image enhancement systems. Here, the enhanced encoder system receives the same low quality image that is provided to the low enhancement system as well as a corresponding labeled high quality image. As an example, the low quality image can be a 1920×1080 resolution image of a face whereas the corresponding labeled high quality image can be a 7680×4320 resolution image of the same face. The enhanced encoder system performs an upsampling process on the low quality image, similar to the upsampling process performed by the image enhancement system. Therefore, the enhanced encoder system generates an upsampled high quality (HQ') image similar to that of the HQ' image generated by the image enhancement system. The enhanced encoder system determines inaccuracies, hereafter referred to a residual, that are present in the HQ' image by comparing the HQ' image to the labeled high quality image and further encodes this residual as the residual bitstream. Here, the residual bitstream represents the additional image information that the image enhancement system can use to further improve the HQ' image.

In various embodiments, the enhanced encoder system trains and applies machine learning models, such as deep learning convolutional neural networks. For example, the enhanced encoder system applies a first convolutional neural network (e.g., an upsampling model) that upsamples a low quality image. As another example, the enhanced encoder system applies a second convolutional neural network (e.g., an encoder model) to encode a residual into a residual bitstream. In various embodiments, the enhanced encoder model trains an autoencoder (e.g., an encoder model and a decoder model) to learn a representation of the residual. The representation, such as the residual bitstream, can be an efficient encoding of the residual and therefore, can be transmitted to the image enhancement system without consuming excessive available bandwidth.

In various embodiments, the enhanced encoder system trains the autoencoder (e.g., encoder model and decoder model) and the upsampling model using training examples to reduce a loss function. In one embodiment, the loss function includes a reconstruction loss that represents a dissimilarity between a high quality image included in the training example and a reconstructed image. The reconstructed image can be the HQ" image generated by combining the HQ' image and the image information included in the residual bitstream. The enhanced encoder system reduces the loss function by repeatedly iterating between a forward pass step and a backpropagation step. During the forward pass step, the autoencoder generates HQ" images by applying the upsampling model and the autoencoder models with estimated parameters. During the backpropagation step, the enhanced encoder system determines the reconstruction loss based on dissimilarity between the high quality image in the training example and the reconstructed HQ" image. The compression system repeatedly updates the estimated set of parameters of the models by backpropagating error terms obtained from the loss function to determine trained sets of parameters for the models.

Figure 1:
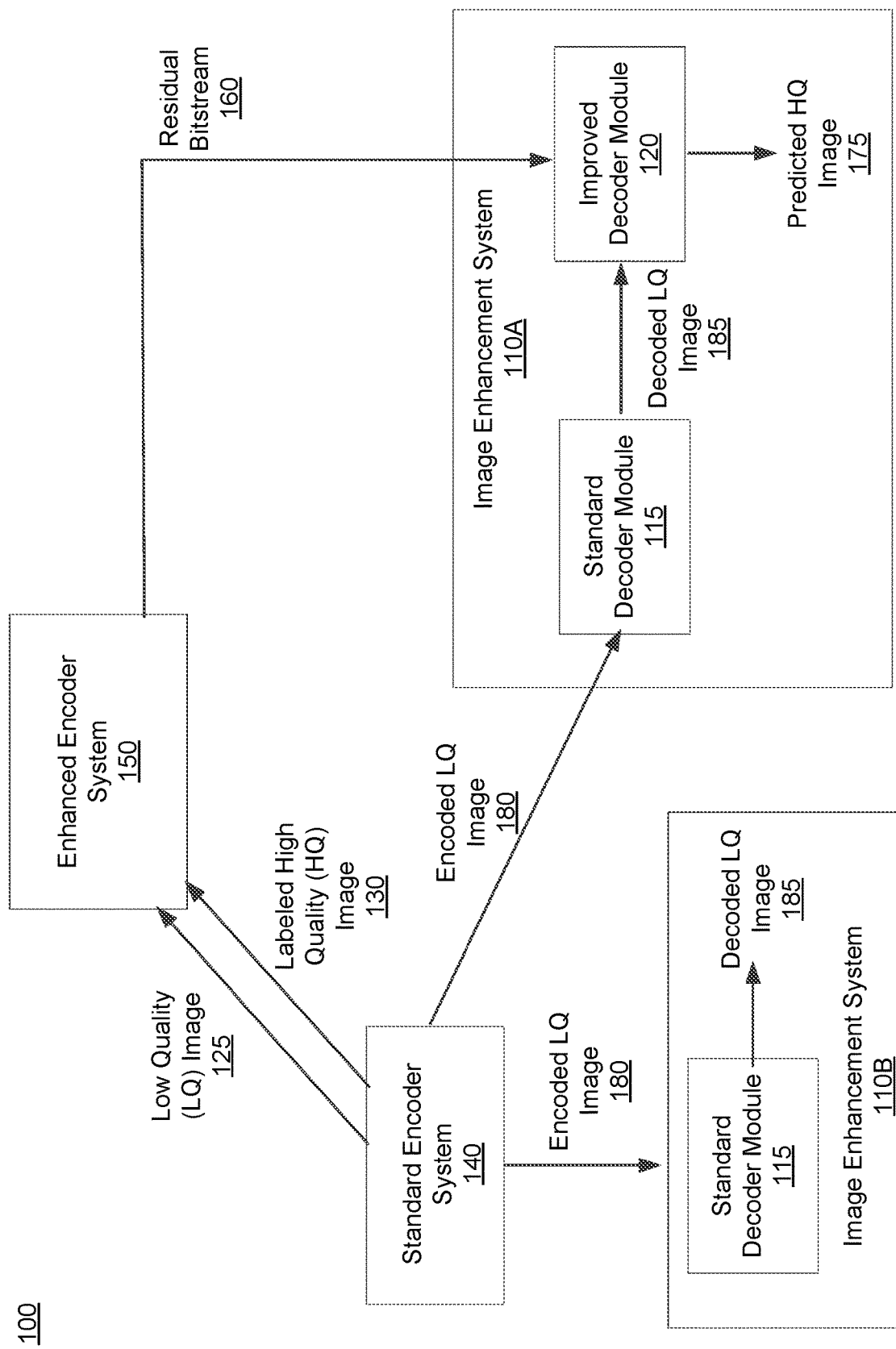
FIG. 1 is an overall system environment where different image enhancement systems can generate images of differing qualities, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "image enhancement system 110" in the text refers to reference numerals "image enhancement system 110A" and/or "image enhancement system 110B" in the figures).

DETAILED DESCRIPTION

Overall System Architecture

FIG. 1 is an overall system environment 100 where different image enhancement systems 110 can generate images of differing qualities, in accordance with an embodiment. The processes performed within the overall system environment 100 will be hereafter described in reference to images; however, the descriptions may be similarly applied to other types of media such as video. Additionally, although examples of image quality are hereafter provided in relation to image resolution, the quality of an image can also refer to any one of an image sharpness, contrast, color accuracy, artifacts, distortion, and noise. Image quality is hereafter described in comparative terms (e.g., low quality and high quality). In one scenario, a low quality image can refer to an image of low sharpness in comparison to a high quality image with high sharpness. In another scenario, a low quality image can refer to an image with high noise in comparison to a high quality image with low noise.

As shown in FIG. 1, the overall system environment 100 includes a standard encoder system 140, an enhanced encoder system 150, and one or more image enhancement systems 110. Each of the image enhancement systems 110A and 110B includes a standard decoder module 115 and optionally, an improved decoder module 120.

Generally, the standard encoder system 140 provides encoded low quality (LQ) images 180 to each image enhancement system 110. Each of the image enhancement systems 110 decodes the encoded LQ images 180 using a standard decoder applied by the standard decoder module 115 to obtain a decoded LQ image 185. Each image enhancement system 110 can use the decoded LQ image 185 or further improve the quality of the decoded LQ image 185 using additional information.

As shown in FIG. 1, an improved decoder module 120 of the image enhancement system 110A can further process the decoded LQ image 185 to generate a predicted high quality (HQ) image 175 using additional information, such as a residual bitstream 160, provided by the enhanced encoder system 150. Here, the image enhancement system 110A is not limited by bandwidth and therefore, is able to receive the additional residual bitstream 160. Conversely, image enhancement system 110B may be limited by available bandwidth and therefore, uses the decoded LQ image 185 without further processing. Image enhancement system 110B can provide the decoded LQ image 185 for display whereas the image enhancement system 110A can provide the predicted HQ image 175 for display.

The enhanced encoder system 150 receives a low quality (LQ) image 125 and a corresponding labeled high quality (HQ) image 130. As an example, a low quality image 125 is an image at a first resolution (e.g., 1920×1080 resolution) whereas the high quality image 125 is the same image at a higher, second resolution (3840×2160 resolution). In various embodiments, each of the LQ image 125 and the labeled HQ image 130 can be received by the enhanced encoder system 150 in a decoded format. Therefore, the enhanced encoder system 150 need not perform a decoding process to decode either the LQ image 125 or labeled HQ image 130.

Generally, the enhanced encoder system 150 upsamples the LQ image 125 to a resolution of the labeled HQ image 130. For example, the enhanced encoder system 150 upsamples the 1920×1080 resolution image to the 3840×2160 resolution. The enhanced encoder system 150 determines a residual which represents the difference between the upsampled image and the labeled HQ image 130 and encodes the residual as a residual bitstream 160. As shown in FIG. 1, the enhanced encoder system 150 provides the residual bitstream 160 to image enhancement system 110A such that the image enhancement system 110A can improve the quality of the decoded LQ image 185. The specific processes performed by the enhanced encoder system 150 to generate the residual bitstream 160 is described in further detail below.

Figure 2:
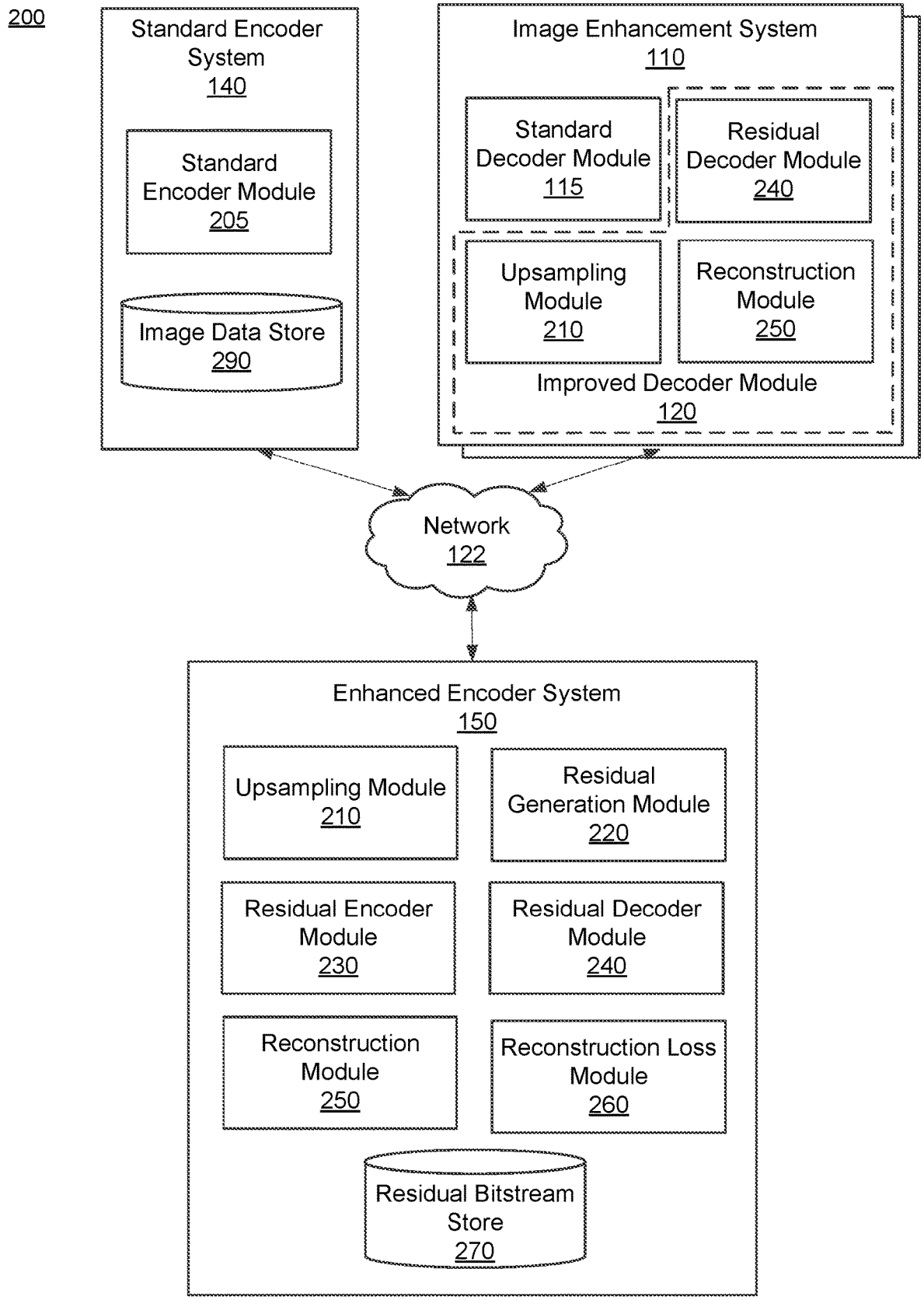
FIG. 2 is a block diagram of a system environment including an enhanced encoder system, in accordance with an embodiment.

FIG. 2 is a system architecture of the standard encoder system 140, enhanced encoder system 150 and image enhancement system 110, in accordance with an embodiment. Each of the systems 110, 140, and 150 are in communication with one another through a network 122.

The network 122 may be any wired or wireless local area network (LAN) and/or wide area network (WAN), such as an intranet, an extranet, or the Internet. In various embodiments, the network 122 uses standard communication technologies and/or protocols. Examples of technologies used by the network 122 include Ethernet, 802.11, 3G, 4G, 802.16, or any other suitable communication technology. The network 122 may use wireless, wired, or a combination of wireless and wired communication technologies. Examples of protocols used by the network 122 include transmission control protocol/Internet protocol (TCP/IP), hypertext transport protocol (HTTP), simple mail transfer protocol (SMTP), file transfer protocol (TCP), or any other suitable communication protocol.

Standard Encoder System 140

The standard encoder system 140 can be a media provider that sends media to both the enhanced encoder system 150 and image enhancement systems 110. As an example, the standard encoder system 140 can be a media server that streams media to image enhancement systems 110. As shown in FIG. 2, the standard encoder system 140 includes a standard encoder module 105 and an image data store 290.

The image data store 290 holds images of varying quality. For example, the image data store 290 includes LQ images 125 as well as labeled HQ images 130 that represent enhanced versions of LQ image 125 counterparts. In some embodiments, the image data store 290 further stores images with an image quality between the image quality of LQ images 125 and the image quality of labeled HQ images 130.

The standard encoder module 205 retrieves images from the image data store 290 and encodes the images using a standard encoder. The standard encoder module 205 can apply a standard encoder that uses an industry standard encoding such as one of H.264, H.265, VP8, VP9, and the like. In particular embodiments, the standard encoder module 205 retrieves low quality images and applies a standard encoder to generate encoded LQ images 180. The standard encoder module 205 can store encoded LQ images 180 in the image data store 290 or alternatively, can provide the encoded LQ images 180 for transmission to image enhancement systems 110.

Image Enhancement System

The image enhancement system 110 can be any system or device capable of providing an image for display. For example, the image enhancement system 110 can be a computing device such as a desktop computer, laptop computer, tablet computer, personal digital assistant (PDA), a mobile telephone, a smartphone, or another suitable device. In various embodiments, the image enhancement system 110 can download or install software, such as software developed by the enhanced encoder system 150, that can be executed to enhance LQ images. For example, as is described below, the enhanced encoder system 150 can train machine learning models (e.g., decoder model). The image enhancement system 110 can download or install software obtained from the enhanced encoder system 150 that can be executed to apply one or more of the machine learning models trained by the enhanced encoder system 150.

As shown in FIG. 1, the image enhancement system 110 decodes the encoded LQ image 180 provided by the standard encoder system 140. This process is performed by the standard decoder module 115. The standard decoder module 115 decodes the encoded LQ images 180 provided by the standard encoder system 140 by applying a standard decoder. A standard decoder uses an industry standard decoding such as one of H.264, H.265, VP8, VP9, and the like. Generally, the standard decoder applied by the standard decoder module 115 performs the opposite function of the standard encoder applied by the standard encoder module 205 of the standard encoder system 140.

In some scenarios, the image enhancement system can further improve the quality of the decoded LQ image 185 given additional image information (e.g., residual bitstream 160) from the enhanced encoder system 150. The improved decoder module 120 of the image enhancement system 110 performs the process of improving the quality of the decoded LQ image 185. As shown in FIG. 2, the improved decoder module 120 further includes an upsampling module 210, a residual decoder module 240, and a reconstruction module 250.

The improved decoder module 120 predicts a high quality version of the decoded LQ image 185 and further improves the high quality version using additional image data encoded in the residual bitstream 160. Specifically, the upsampling module 210 upsamples the decoded LQ image 185 to obtain an initial upsampled HQ image by applying a trained upsampling model. Here, the initial upsampled HQ image may still include deficiencies such as image artifacts due to the upsampling process. To further improve the accuracy of the upsampled HQ image, the residual decoder module 240 decodes the residual bitstream 160 received from the enhanced encoder system 150. The reconstruction module 250 combines the decoded residual bitstream with the upsampled HQ image to predict a HQ image 175 that represents a further improvement in comparison to the upsampled HQ image generated by the upsampling module 210. The predicted HQ image 175 can then be provided for display for user consumption. The aforementioned functions and components of the improved decoder module 120 are described in further detail below in relation to FIG. 4 and FIG. 7.

Enhanced Encoder System 150

The enhanced encoder system 150 can be one or more electronic devices associated with an enterprise or entity. In some embodiments, the functions performed by the enhanced encoder system 150 can be distributed across a cloud server or rack server. In other words, the functions performed by the enhanced encoder system 150 can be distributed across multiple electronic devices and/or distributed across multiple geographic locations.

The enhanced encoder system 150 processes a LQ image 125 and a corresponding labeled HQ image 130 to generate a residual bitstream 160. Generally, the residual bitstream 160 is an encoded bitstream of an error between a labeled HQ image 130 and an upsampled HQ image predicted from the LQ image 125. Therefore, the residual bitstream 160 contains image information that can be used to correct for image deficiencies within the upsampled HQ image, thereby enabling a more accurate predicted HQ image 175 when only provided the LQ image 125. To perform these aforementioned functions, the enhanced encoder system 150 includes an upsampling module 210, a residual generation module 220, a residual encoder module 230, a residual decoder module 240, a reconstruction module 250, and a reconstruction loss module 260.

In various embodiments, the enhanced encoder system 150 trains and applies one or more machine learning models. As referred to hereafter, the training phase refers to the steps for training the machine learning models whereas the deployment phase refers to the application of the machine learning model to generate a residual bitstream 160 (e.g., by the enhanced encoder system 150) and subsequently to generate a predicted HQ image 175 (e.g., by the image enhancement system 110). The functions performed by the individual modules during the training phase and deployment phase are described in further detail below.

Training Machine Learning Models

Figure 3A:
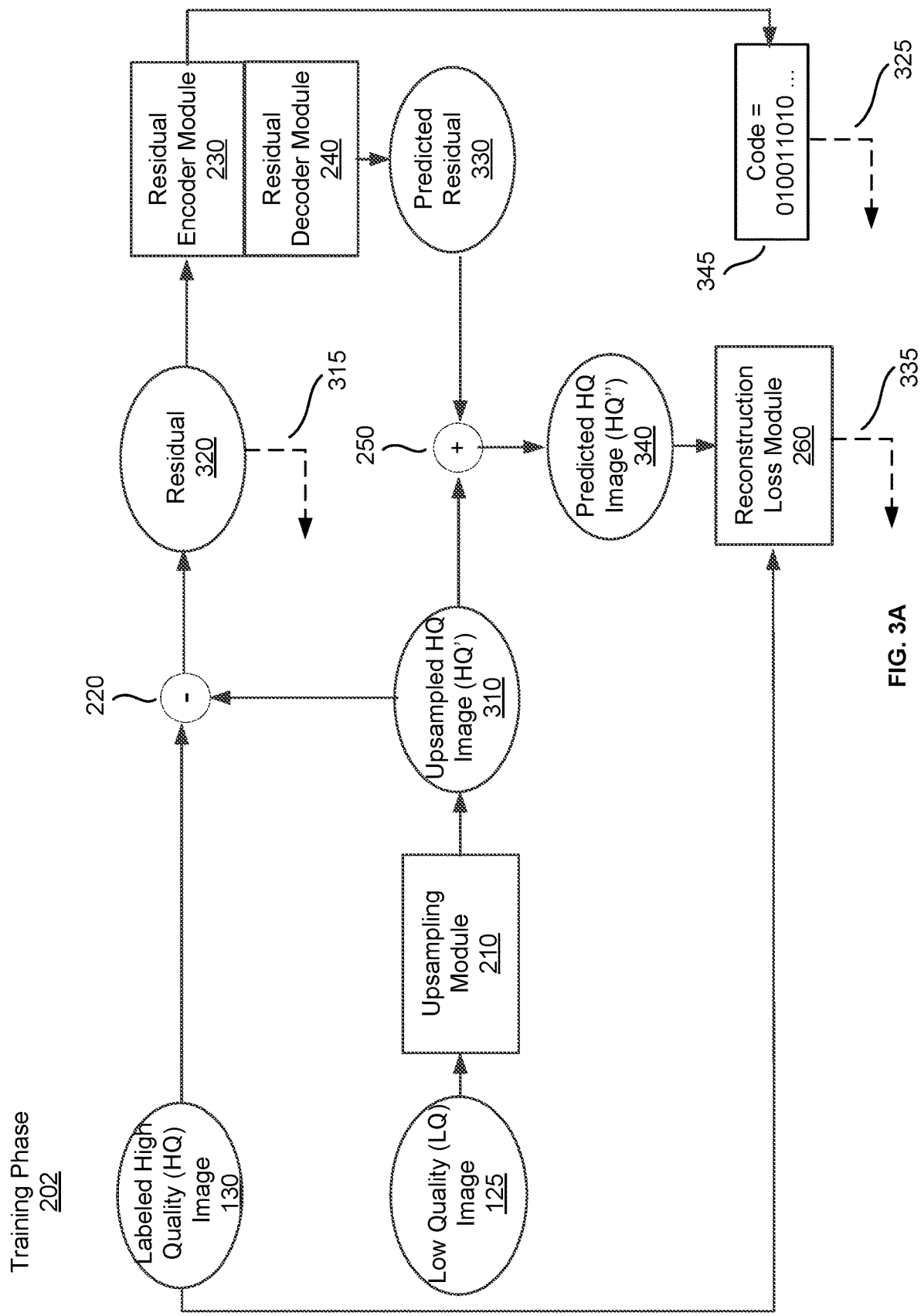
FIG. 3A is a flow diagram of the architecture of the enhanced encoder system during the training phase, in accordance with an embodiment.

FIG. 3A is a flow diagram of the architecture of the enhanced encoder system 150 during the training phase 202, in accordance with an embodiment. During the training phase 202, the enhanced encoder system 150 trains machine learning models using training images, shown in FIG. 3A to be LQ image 125 and corresponding labeled HQ image 130. In various embodiments, each of the upsampling module 210, residual encoder module 230, and the residual decoder module 240 train a machine learning model. Here, the training can be conducted using supervised learning.

Generally, the enhanced encoder system 150 trains a compression model, which includes the upsampling model, encoder model, and decoder model, using a set of training examples to reduce a loss function. Each training example can include a low quality (LQ) image 125 and a corresponding labeled high quality (HQ) image 130. In one embodiment, the loss function includes a reconstruction loss 335 that represents dissimilarity between the labeled HQ image 130 and a reconstructed version of the HQ image (e.g., predicted HQ image (HQ″) 340 in FIG. 3A). By training the encoder model (e.g., the model applied by the residual encoder module 230) and the decoder model (e.g., the model applied by the residual decoder module 230) using the loss function, the encoder model is trained to output a compressed representation for a residual 320 that, when synthesized by the decoder model, generates a predicted residual 330 that closely resembles the original residual 320.

In one embodiment, the enhanced encoder system 150 trains the encoder model to preferentially encode a higher degree of information for regions in the residual 320 that are associated with characteristic objects, such as human faces, texts, or buildings. For example, the enhanced encoder system 150 may use trained weight maps that can more heavily weigh the characteristic objects represented in the compressed representation. Trained weight maps can be constructed using machine-learned object detection algorithms. The decoder model can be applied to the weighted compressed representation to reconstruct the predicted residual 330. Here, regions of the predicted residual 330 associated with characteristic objects may be reconstructed at a higher quality than other regions of the predicted residual 330. When the predicted residual 330 is combined with the upsampled HQ image (HQ') 310 to reconstruct the predicted HQ image (HQ″) 340, regions of the predicted HQ image (HQ″) 340 that are associated with the characteristic objects can be reconstructed at a higher quality than other regions of the predicted HQ image (HQ″) 340.

Referring specifically to the training flow process shown in FIG. 3A, the upsampling module 210 upsamples the LQ image 125 to generate an upsampled HQ image (HQ') 310. In various embodiments the upsampling module 210 applies an upsampling model that upsamples the LQ image 125. As an example, the upsampling model can predict additional pixels of the HQ' image 310 given the lower resolution of the LQ image 125 by analyzing patterns observed in the LQ image 125. Here, the upsampling model can perform an interpolation process to generate additional pixels of the HQ' image 310.

In various embodiments, the upsampling model is a machine learning model such as a convolutional neural network. The upsampling module 210 performs a feature extraction process to extract features from the LQ image 125 and generates a feature vector that is provided as input to the upsampling model. In some embodiments, the upsampling module 210 provides the LQ image 125 to the upsampling model such that the upsampling model can perform the feature extraction process to identify features of the LQ image 125. The structure of the upsampling model is described in further detail below.

The HQ' image 310 and the labeled HQ image 130 are each provided to the residual generation module 220 which determines a residual 320. The residual 320 represents a difference between the labeled HQ image 130 and the HQ' image 310. In one embodiment, the residual generation module 220 conducts a pixel-by-pixel analysis between pixels of the labeled HQ image 130 and the pixels of the HQ' image 310. Thus, the residual 320 can represent the pixel-by-pixel difference between the labeled HQ image 130 and the HQ' image 310. As an example, if the HQ' image 310 and the labeled HQ image 130 are each a M×N image, the residual generation module 220 determines a residual 320 that can also be an M×N image, where each pixel in the residual 320 is a difference between corresponding pixels in the HQ' image 310 and the labeled HQ image 130.

In some embodiments, the residual 320 represents a component of the loss function and can be used to train the upsampling model. For example, the magnitude of the residual 320, hereafter referred to as a residual loss 315, can be backpropagated to the upsampling module 210 such that the upsampling model can be trained to better predict an HQ' image 310 to minimize the residual loss 315. For example, if the upsampling model is a deep convolutional neural network, the residual 320 is backpropagated to adjust the learned biases and weights associated with nodes in the neural network.

Figure 3B:
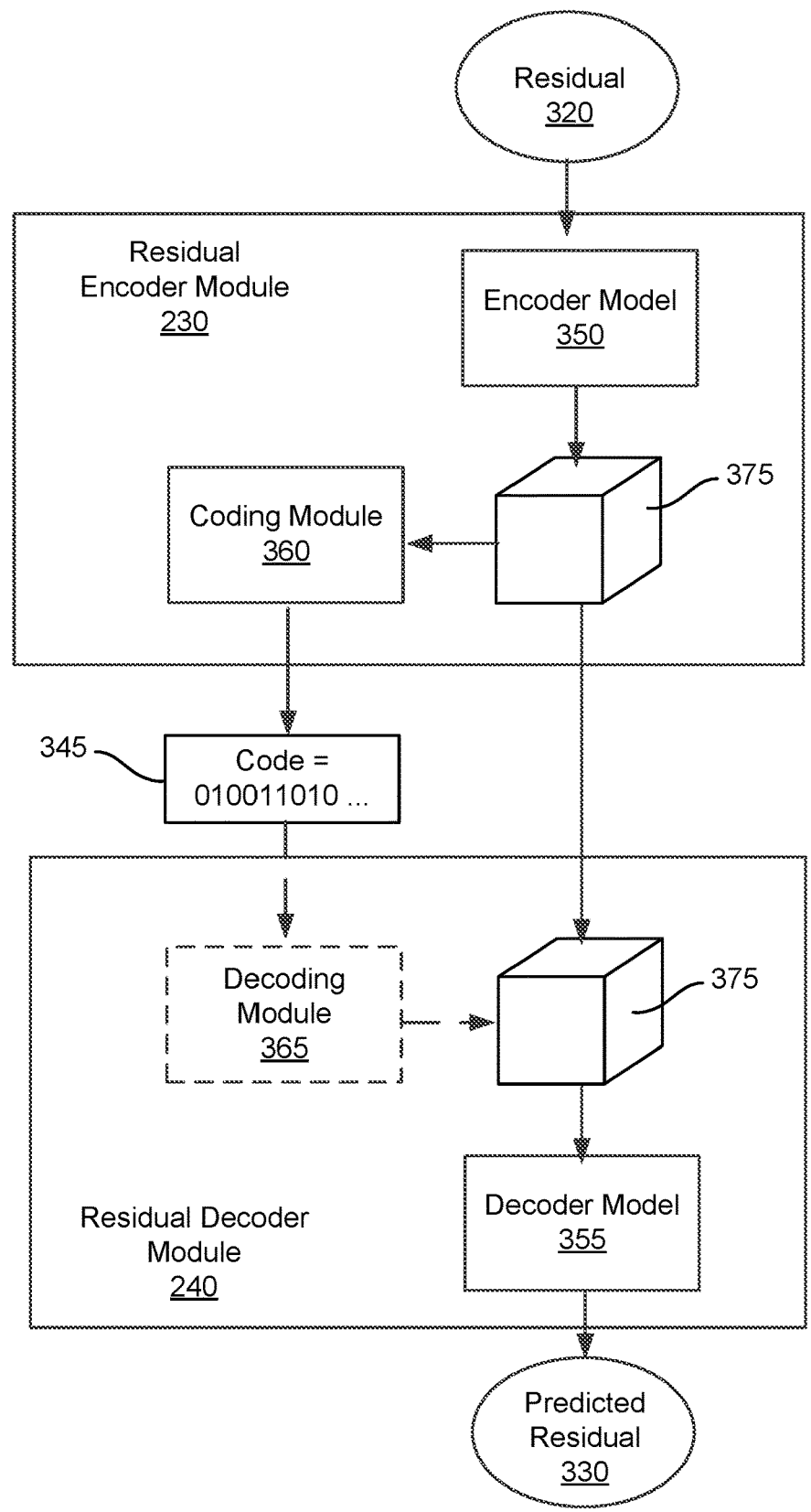
FIG. 3B depicts the architecture of the residual encoder module and residual decoder module, in accordance with an embodiment.

The residual 320 is provided to an encoder/decoder block, which is shown in FIG. 3A as the residual encoder module 230 and the residual decoder module 240. Reference is now made to FIG. 3B which depicts the architecture of the residual encoder module 230 and residual decoder module 240, in accordance with an embodiment.

In some embodiments, the residual encoder module 230 intelligently encodes the residual 320. Here, the encoder/decoder block applies an autoencoder model (e.g., encoder model and decoder model) that attempts to learn a representation of the residual 320. In various embodiments, the representation of the residual 320 is a tensor 375 including structural features of the residual 320.

As shown in FIG. 3B, the residual encoder module 230 applies the residual 320 as input to the encoder model 350. The encoder model 350 identifies structures and patterns in the residual 320 and outputs a tensor 375 of the residual 320. In various embodiments, the tensor 375 has dimensions of width W, height H, and depth C, in which $y_{chw}$ denotes an element of the tensor 375 at channel depth c=1, 2, . . . , C, height h=1, 2, . . . , H, and width w=1, 2, . . . , W. The tensor 375 is a compact representation of the residual 320 with respect to the structural features of the residual 320. Specifically, each W×H feature map of the tensor 375 at a particular channel depth c may be associated with the presence of a corresponding structural feature in the residual 320.

In some embodiments, encoder model 350 performs additional processing steps on the tensor 375. For example, the encoder model 350 may quantize the elements of the tensor 375 to categorize the elements into B equal-sized bins. As another example, the encoder model 350 may decompose the quantized elements into bitplanes such that the tensor 375 is a binary tensor. Further description of these steps performed by an encoder model (e.g., feature extraction, quantization, and bitplane decomposition) are described in U.S. application Ser. No. 15/439,893, filed on Feb. 22, 2017, which is hereby incorporated by reference in its entirety.

As shown in FIG. 3B, the coding module 360 receives the tensor 375 and generates compressed codes 345. The coding module 360 performs an entropy coding process. In one embodiment, the entropy coding process is an adaptive arithmetic coding process. The adaptive arithmetic coding process is described in further detail in U.S. application Ser. No. 15/439,893, filed on Feb. 22, 2017, which is hereby incorporated by reference in its entirety. Other examples of entropy coding processes include range coding, Huffman encoding, Asymmetric numeral systems, and other methods.

The compressed codes 345 possesses a codelength that can be used to further train the upsampling model, encoder model, and decoder model. Returning to FIG. 3A, the compressed codes 345 can be used to generate a codelength regularization loss 325 that is included as a component of the loss function. Therefore, the codelength regularization loss 325 can be used in conjunction with the reconstruction loss 335 to train the models.

The codelength regularization loss 325 is determined based on the magnitude of the elements of the tensor 375 output by the encoder model 350, and is repeatedly adjusted by the enhanced encoder system 150 such that the length of the compressed codes 345 generated by the coding module 360 achieves a desired target length. By including both the codelength regularization loss and the reconstruction loss 335 in the loss function, the encoder model 350 can be trained to exploit the structure of the residual 320 to generate a tensor 375 that reduces the length of the compressed code 345 while achieving reasonable reconstruction fidelity. For example, a residual 320 with a simple structure may be encoded with a shorter code length than a residual 320 with a complex structure.

In one embodiment, the codelength regularization loss 325 is given by:

$$\mathcal{L}_{cl}(\hat{y}_{i \in S}; \alpha) = \sum_{i \in S} \left[ \frac{\alpha_t}{CHW} \cdot \sum_{chw} \left[ \log_2 |\hat{y}_{i,chw}| + \sum_{(x,y) \in U} \log_2 |\hat{y}_{i,chw} - \hat{y}_{i,(h-y)(w-x)}| \right] \right]$$

where U is the set $\{(0, 1), (1, 0), (1, 1), (-1, 1)\}$, $\alpha_t$ is a weight, and $\hat{y}_{i,chw}$ denotes element chw of the quantized set of tensors generated from training examples. The enhanced encoder system 150 may adjust the weight $\alpha_t$ of the codelength regularization loss 345 according to the length of the compressed code 345 generated by applying the coding module 360 to the set of quantized tensors $\hat{y}_{i \in S}$. Specifically, the enhanced encoder system 150 increases the weight $\alpha_t$ if the length of the compressed codes 345 is above a target length, and decreases the weight $\alpha_t$ if the length is below a target length. The enhanced encoder system 150 may adjust the weight $\alpha_t$ at each backpropagation step. In this manner, parameters of the encoder model 350 are trained to generate a tensor 375 that exploit relatively simple structures of the residual 320 when possible.

Returning to FIG. 3B, the residual decoder module 240 may perform different procedures during training and deployment. During training, the residual decoder module 240 receives the tensor 375 from the residual encoder module 230 and applies the tensor 375 as input to the decoder model 355. Generally, the decoder model 355 performs the opposite operation performed by the encoder model 350. For example, given that the encoder model 350 performs a feature extraction process to generate the tensor 375, the decoder model 355 performs a feature synthesis process to reconstruct a predicted residual 330. In various embodiments, the decoder model 355 may perform additional processing steps to reverse processing steps performed by the encoder model 355. For example, the decoder model 355 can combine bitplanes of a binary tensor to regenerate the tensor 375.

During training, the residual decoder module 240 can optionally include an decoding module 365. The decoding module 365 can perform an inverse operation performed by the coding module 360. Given that the decoding module 365 converts compressed codes 345 to the tensor 375, the decoding module 365 is not needed during the training phase and is only employed during the deployment phase. Since the residual encoder module 230 and residual decoder module 240 are both included in the enhanced encoder system 150 during the training phase, the tensor 375 can be directly provided from the encoder model 350 to the decoder model 355.

Returning to FIG. 3A, the predicted residual 330 outputted by the decoder model 355 is provided to the reconstruction module 250. Generally, the reconstruction module 250 combines the predicted residual 330 with the upsampled HQ image 310 to remove deficiencies in in the upsampled HQ image 310. The reconstruction module 250 reconstructs a predicted HQ image (HQ") 340. Here, the HQ" image 340 represents an improved image in comparison to the HQ' image 310.

The reconstruction loss module 260 determines the reconstruction loss 335 between two images. As shown in FIG. 3A, the reconstruction loss module 260 calculates a reconstruction loss 335 between a first image (e.g., HQ" image 340) and a second image (e.g., the labeled HQ image 130 received by the enhanced encoder system 150). The reconstruction loss 335 represents the dissimilarity between the labeled HQ image 130 and the HQ" image 340.

The reconstruction loss module 260 can employ methods that are well known in the art to determine the dissimilarity between the labeled HQ image 130 and the HQ" image 340. As one example, the reconstruction loss module 260 calculates differences of pixel values between the two images. As another example, the reconstruction loss module 260 conducts a pixel by pixel analysis and calculates a mean-square error or a root-mean-square deviation between the two images. In other scenarios, the reconstruction loss module 260 uses sophisticated metrics that consider differences in gradient space as well as over multiple scales, such as Structural Similarity Index (SSIM) or Multi-Scale SSIM (MS-SSIM). Other quality metrics of the quality loss include Peak signal-to-noise ratio (PSNR), Sobel loss, L1-norm, or L2-norm.

The reconstruction loss module 260 backpropagates the reconstruction loss 335. As described above, the reconstruction loss 335 is a component of the loss function that is backpropagated to train the upsampling model, encoder model, and decoder model. Each of the upsampling module 210, residual encoder module 230, and the residual decoder module 240 uses the backpropagated reconstruction loss 335 to train their respective models to minimize the reconstruction loss 335. In various embodiments, two or more of the upsampling model, encoder model, and decoder model can be jointly trained together. For example, the parameters of each of the upsampling model, encoder model, and decoder model can be jointly adjusted to minimize the backpropagated reconstruction loss. In various embodiments, the upsampling model, the encoder model, and the decoder model can be repeatedly trained until the loss function satisfies a predetermined criteria. For example, if the loss function is below a threshold, the training process is stopped.

Once the models are trained, the enhanced encoder system 110 can provide the image enhancement system 110 with the upsampling module 210 (including the trained upsampling model) as well as the residual decoder module 240 (including the decoding module 365 and the decoder model 355).

Structure of Machine Learning Models

The upsampling model, encoder model, and decoder model can each be a portion of a compression model. The compression model can be a neural network composed of multiple layers including an input layer, output layer, and one or more intermediate layers. The upsampling model can be a first portion of the compression model, the encoder model can be a second portion of the compression model, and the decoder model can be a third portion of the compression model.

Each model of the upsampling model, encoder model, and decoder model can be a deep convolutional neural network composed of multiple layers. Here, each of the upsampling model, encoder model, and decoder model can include an input layer of nodes, an output layer of nodes, and one or more hidden layers of nodes between the input and output layers. Each layer can be associated with learned parameters that are adjusted during training due to the loss function. Examples of learned parameters include learned weights and learned biases.

Referring first to the upsampling model, it can be neural network that receives a first image and performs an upsampling of the first image to generate a second image. As an example, the first image is an image of a low quality (e.g., LQ image 125) and the second image is an image of higher quality (e.g., HQ' image 310). In particular embodiments, the first image is an image at a first image resolution and the second image is an image at a second image resolution that is higher than the first image resolution. Here, each node in the input layer of nodes of the upsampling model can be a value of a pixel of the LQ image 125. Additionally, each node of the output layer of the upsampling model can be a value of a pixel of the HQ' image 310.

Referring to the encoder model, it can be neural network that receives a residual 320 and identifies structures and patterns of the residual 320 to generate a tensor of the residual 320. As an example, each node of the input layer can be a value of a pixel of the residual 320. Each node of the output layer of the encoder model can represent an element of the tensor 375 for the residual 320.

For the decoder model, it receives the tensor 375 for the residual 320. The decoder model synthesizes the elements of the tensor 375 and outputs a predicted residual. In various embodiments, each node of the output layer of the decoder model represents a pixel of the predicted residual 330. The structure of the decoder model can be an inverse of the structure of the encoder model. The number of nodes of the output layer of the decoder model can be the same number of nodes of the input layer of the encoder model.

In various embodiments, the encoder model 350 and the decoder model 355 form an autoencoder. Here, the output layer of nodes of the encoder model 350 forms the input layer of nodes of the decoder model 355. Additionally, the learned parameters of the encoder model 350 are tied to the learned parameters of the decoder model 355. Therefore, the tied parameters of the two models can be jointly adjusted due to the backpropagated reconstruction loss.

Deployment Phase

Overall System Architecture for Deployment

Figure 4:
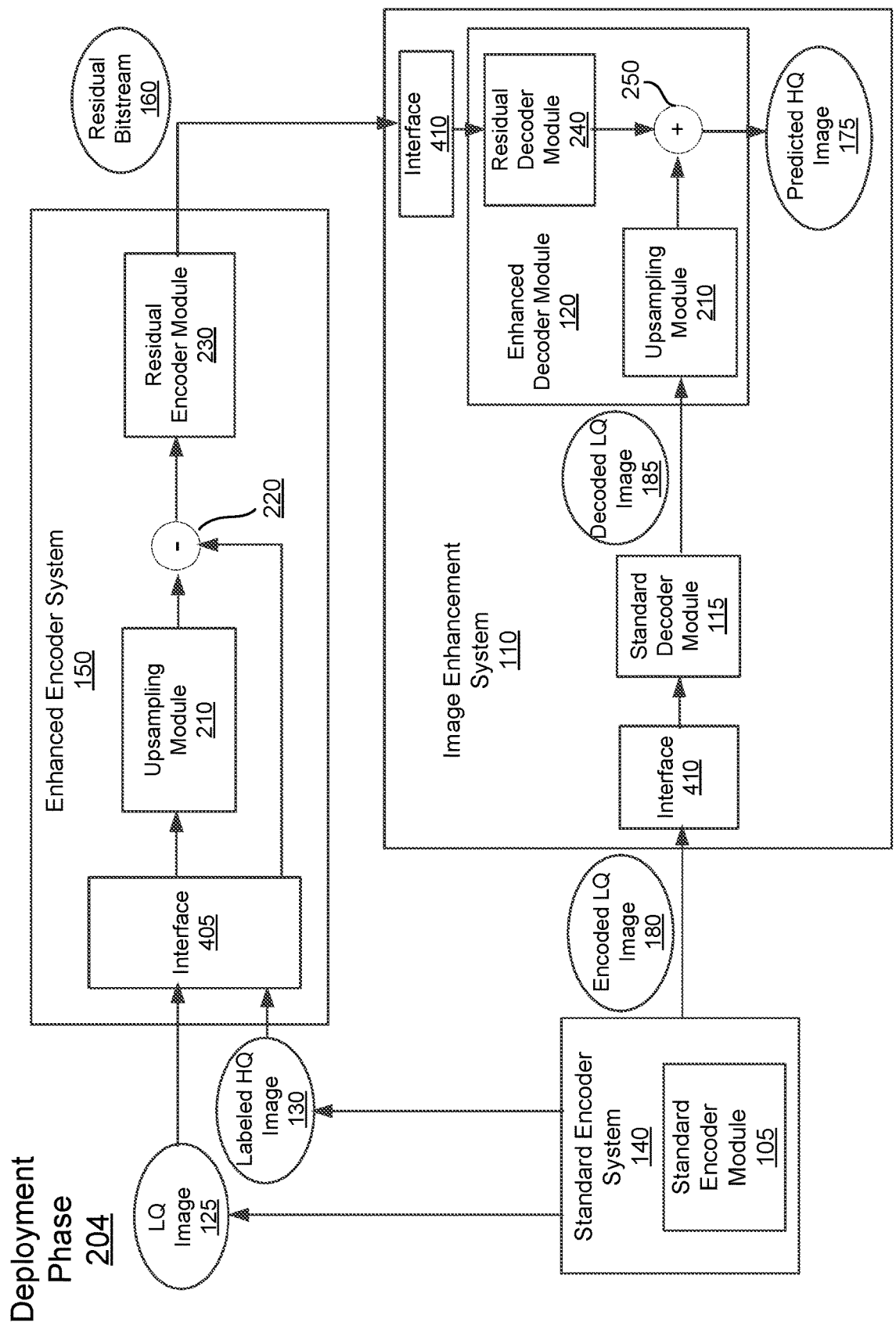
FIG. 4 depicts an overall flow diagram for predicting a high quality image during the deployment phase, in accordance with an embodiment.

FIG. 4 depicts an overall flow diagram for enabling an image enhancement system 110 to predict a high quality image 175 during the deployment phase 204, in accordance with an embodiment.

The standard encoder system 140 provides a LQ image 125 and a labeled HQ image 130 to the enhanced encoder system 150. Additionally, the standard encoder module 105 of the standard encoder system 140 encodes the LQ image 125 using a standard encoding. The standard encoder system 140 provides the encoded LQ image 180 to the image enhancement system 110. In various embodiments, the standard encoder system 140 can provide the LQ image 125 and labeled HQ image 130 to the enhanced encoder system 150 at a first time point and provides the encoded LQ image 180 to the image enhancement system 110 at a second time point. For example, the standard encoder system 140 can provide the LQ image 125 and labeled HQ image 130 when the standard encoder system 140 obtains the images. Alternatively, the standard encoder system 140 can provide the encoded LQ image 180 to the image enhancement system 110 after receiving a request from the image enhancement system 110 for an image.

The enhanced encoder system 150 employs the an interface 405, the upsampling module 210, the residual generation module 220, and the residual encoder module 230 during the deployment phase 204. The interface 405 receives the LQ image 125 and the labeled HQ image 130 from the standard encoder system 140. As shown in FIG. 4, the interface 405 provides the LQ image 125 to the upsampling module 210 and the labeled HQ image 130 to the residual generation module 220.

The upsampling module 210 applies the upsampling model to the LQ image 125 to generate an upsampled HQ image (e.g., HQ' image 310). The residual generation module 220 determines a residual 320 between the labeled HQ image 130 and the HQ' image 310. The residual encoder module 230 encodes the residual 320 to generate the residual bitstream 160. As discussed above, the residual encoder module 230 can apply an encoder model to generate a tensor for the residual. The tensor undergoes entropy encoding to generate the residual bitstream 160. The enhanced encoder system 150 can store the residual bitstream 160, such as in residual bitstream store 270 shown in FIG. 2, until the residual bitstream 160 is needed by an image enhancement system 110.

The image enhancement system 110 generates a predicted HQ image 175 given the encoded LQ image 180 from the standard encoder system 140 and the residual bitstream 160 from the enhanced encoder system 150. Here, the improved decoder module 120 of the image enhancement system 110 includes the upsampling module 210, residual decoder module 240, and reconstruction module 250.

As shown in FIG. 4, the interface 410 of the image enhancement system 110 receives an encoded LQ image 180 and provides the encoded LQ image 180 to the standard decoder module 115. The standard decoder module 115 decodes the encoded LQ image 180 to produce the decoded LQ image 185. The decoded LQ image 185 is upsampled by the upsampling module 210.

The image enhancement system 110 further receives, through an interface 410, the residual bitstream 160 transmitted by the enhanced encoder system 150. The interface 410 provides the residual bitstream 160 to the residual decoder module 240. Referring briefly to FIG. 3B, the decoding module 365 is employed during the deployment phase and receives the residual bitstream 160, which is in the form of compressed codes. The decoding module 365 performs a decoding process to generate a tensor 375, which is a compressed representation of a residual generated by the enhanced encoder system 150. The decoding module 365 can perform an entropy decoding process. An example of the entropy decoding process is an adaptive arithmetic decoding process. The residual decoder module 240 applies the generated tensor 375 as input to the decoder model 355 to obtain the predicted residual 330.

As shown in FIG. 4, the reconstruction module 250 constructs the predicted HQ image 175 by combining the predicted residual 330 from the residual decoder module 240 and the HQ' image 310 generated by the upsampling module 210. Here, the reconstruction module 250 of the image enhancement system 110 can perform the same functions as described above in reference to FIG. 3A.

Altogether, the predicted HQ image 175 is of a higher quality in comparison to the decoded LQ image 185. Additionally, the predicted HQ image 175 represents an improvement over the upsampled high quality image predicted by the upsampling module 210. Therefore, when provided for display, the predicted HQ image 175 can provide an improved user viewing experience.

Providing Additional Residual Bitstreams to Further Improve Image Quality

In various embodiments, the enhanced encoder system 150 can send more than one residual bitstream 160. Generally, the additional residual bitstreams 160 enable the image enhancement system 110 to generate even higher quality images by utilizing the additional information provided in the additional residual bitstreams 160. The enhanced encoder system 150 can decide the number of residual bitstreams 160 to send to an image enhancement system 110 depending on a limiting factor, such as bandwidth availability. For example, the enhanced encoder system 150 can send additional residual bitstreams 160 to an image enhancement system 110 that has higher bandwidth availability. In some embodiments, the limiting factor can be a hardware limitation. For example, the image enhancement system 110 may include a touchscreen with a particular resolution and therefore, can only display images with a maximum resolution that matches the resolution of the touchscreen.

Figure 5:
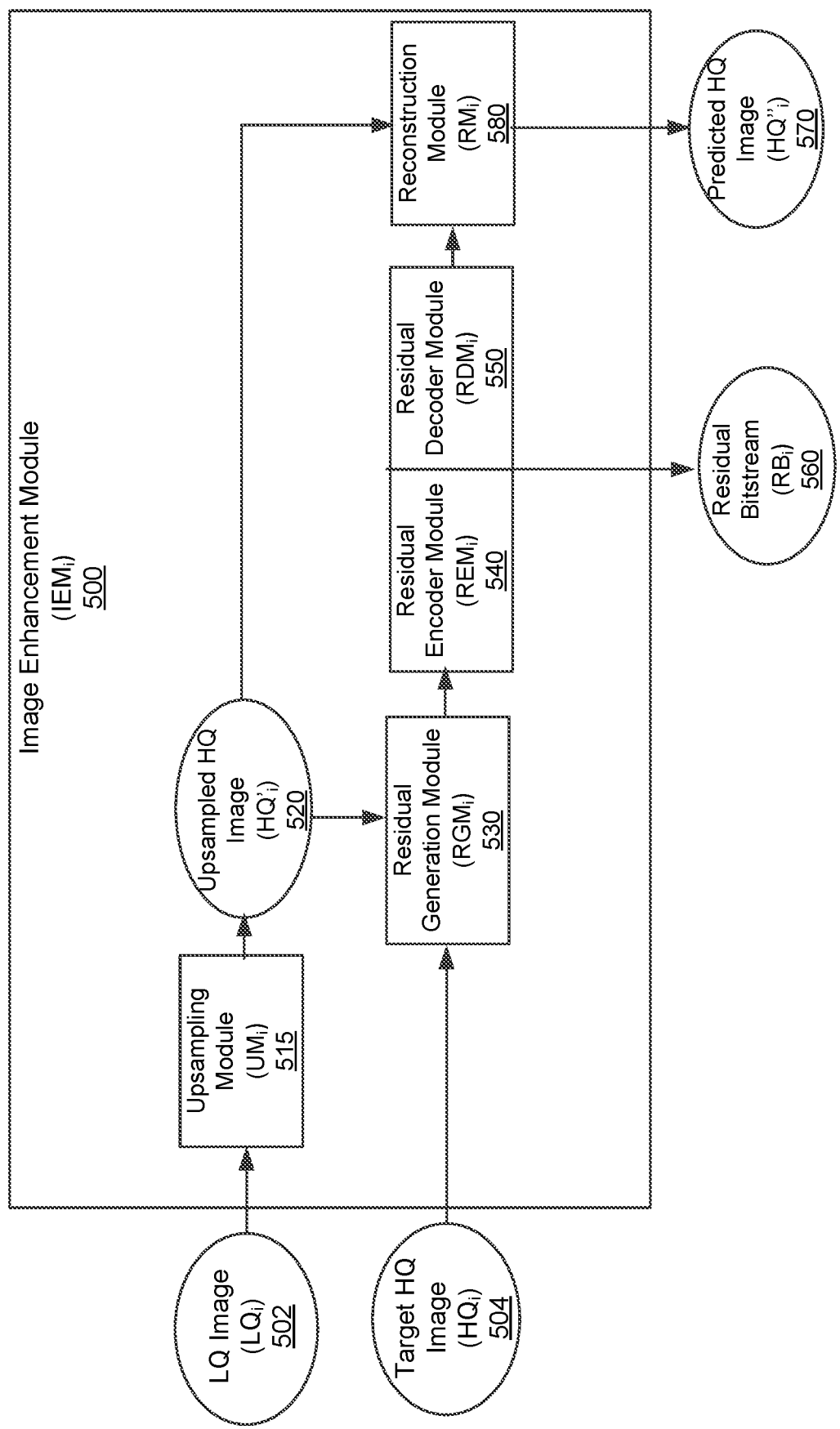
FIG. 5 depicts a flow diagram of an example image enhancement module of the enhanced encoder system, in accordance with an embodiment.

Reference is now made to FIG. 5 which depicts a flow diagram of an example image enhancement module 500 of the enhanced encoder system 150, in accordance with an embodiment. In some embodiments, multiple image enhancement modules 500 are included in the enhanced encoder system 150. Here, each image enhancement module 500 generates a residual bitstream ($RB_i$) 560 from a LQ image ($LQ_i$) 502 and a HQ image ($HQ_i$) 504.

In various embodiments, the image enhancement module (IEM) 500 is specific for a particular level. Each level corresponds to a process of improving a quality of a first image to a quality of a second image. For example, at the ith level, the IEM 500 at that level (e.g., $IEM_i$) predicts a HQ image at the ith level (e.g., $HQ''_i$ 570) given the LQ image at the ith level (e.g., $LQ_i$ 502) and the HQ image at the ith level (e.g., $HQ_i$ 504). At the i+1 level, a different IEM (e.g., $IEM_{i+1}$) performs a function to predict a HQ image at the i+1 level (e.g., $HQ''_{i+1}$) given an LQ image at the i+1 level (e.g., $LQ_{i+1}$) and a HQ image at the i+1 level (e.g., $HQ_{i+1}$). The quality of each image (e.g., LQ image 502, HQ image 504, and HQ" image 570) at a first level is lower than the quality of each corresponding image at a second, higher level.

To provide an example, a first level can correspond to the process of improving a 720×480 resolution image to a 1280×720 resolution image. A second level can correspond to the process of improving a 1280×720 resolution image to a 1920×1080 resolution image. Subsequent levels can include the further improvement of higher resolution images.

The IEM 500 at the ith level (e.g., $IEM_i$) includes an upsampling module ($UM_i$ 515), a residual generation module ($RGM_i$ 530), an encoder/decoder block composed of a residual encoder module ($REM_i$ 540) and a residual decoder module ($RDM_i$ 550), and a reconstruction module ($RM_i$ 580). Although not explicitly shown, the IEM 500 can also include an interface that receives the images (e.g., $LQ_i$ image 502 and $HQ_i$ 504) and provides the images to the appropriate modules. Each of the $UM_i$ 515, $RGM_i$ 530, $REM_i$ 540, $RDM_i$ 550, and $RM_i$ 580 are specific for the ith level. For example, the $UM_i$ 515 can process an LQ image 502 at the ith level. Similarly, the $REM_i$ 540 and $RDM_i$ 550 apply respective models that are trained to process information corresponding to the LQ image 502 and HQ image 504 at the ith level. The $RM_i$ 580 reconstructs the HQ" image 570 at the ith level.

The $UM_i$ 515 receives and upsamples the $LQ_i$ image 502 to generate an upsampled HQ image ($HQ'_i$) 520. Specifically, the $UM_i$ 515 applies an upsampling model that is trained to upsample the $LQ_i$ image 502 to an image quality of the $HQ_i$ image 510. The $RGM_i$ 530 compares the $HQ'_i$ 520 to the target HQ image 504 and determines a residual representing a difference between the two images. The $REM_i$ encodes the residual to produce compressed codes in the form of a residual bitstream ($RB_i$ 560). As stated above, an encoder model can be applied to generate a tensor for the residual. The tensor can undergo an entropy coding process to generate the compressed codes in the form of the residual bitstream ($RB_i$ 560). The $RB_i$ 560 can be outputted by the $IEM_i$ 500 and stored to be provided to an image enhancement system 110.

The $RDM_i$ 550 receives the generated tensor from the $REM_i$ 540 and applies a decoder model to generate a predicted residual. The $RM_i$ 580 reconstructs the predicted HQ ($HQ''_i$) image 570 by combining the predicted residual from the $RDM_i$ 550 and the $HQ'_i$ 520. The HQ image 510 and the $HQ''_i$ image 570 may each be at the same resolution. Additionally, the $HQ''_i$ image 570 is improved in comparison to the HQ image 510.

Cascading Image Enhancement Modules

Figure 6:
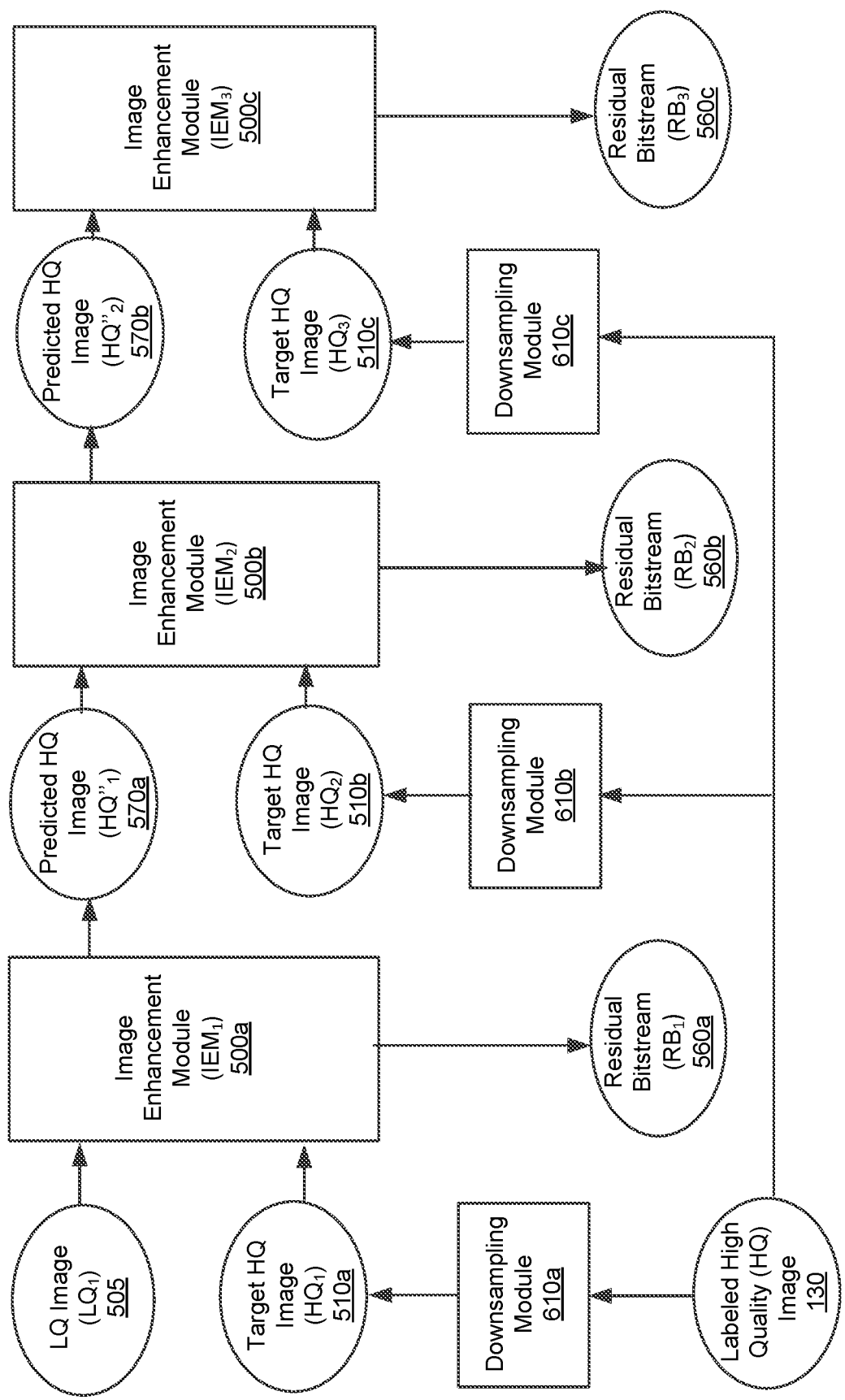
FIG. 6 depicts a flow diagram of cascading image enhancement modules for generating residual bitstreams at different scales, in accordance with an embodiment.

FIG. 6 depicts a flow diagram of the enhanced encoder system 150 that implements cascading image enhancement modules 500 for generating residual bitstreams 560 at different levels, in accordance with an embodiment. FIG. 6 depicts three image enhancement modules 500 (e.g., $IEM_1$ 500a, $IEM_2$ 500b, and $IEM_3$ 500c) that each receives two images and generates a residual bitstream (e.g., $RR_1$ 560a, $RB_2$ 560b, $RB_3$ 560c) and optionally, a predicted HQ image (e.g., $HQ''_1$ 570a and $HQ''_2$ 570b). Although FIG. 6 depicts three image enhancement modules 500, fewer or additional image enhancement modules 500 can be implemented to generate fewer or additional residual bitstreams 560.

The enhanced encoder system 150 receives a LQ image at a first level (e.g., $LQ_1$ 505) and a labeled HQ image 130. Both $LQ_1$ 505 and the labeled HQ image 130 can be provided by the standard encoder system 140. In various embodiments, the labeled HQ image 130 represents the highest quality version of that image handled by the enhanced encoder system 150. Thus, the enhanced encoder system 150 can generate images at multiple scales between the $LQ_1$ image 505 and the labeled HQ image 130. As an example, the LQ image may be a low resolution image (e.g., 720×480 resolution) whereas the labeled HQ image 130 may be an image with a significantly higher resolution (e.g., 7680×4320 resolution). In various embodiments, the labeled HQ image 130 may be a version of the image at a maximum quality. A maximum quality can be a maximum image resolution (e.g., 8 k resolution) that can be handled by image enhancement systems 110.

The labeled HQ image 130 is downsampled to target HQ images 510 at various levels. As shown in FIG. 6, the labeled HQ image 130 is provided as input to downsampling modules 610a, 610b, and 610c. Downsampling module 610a generates a HQ image at a first level (e.g., $HQ_1$ 510a), downsampling module 610b generates a HQ image at a second level (e.g., $HQ_2$ 510b) and downsampling module 610c generates a HQ image at a third level (e.g., $HQ_3$ 510c). As an example, if labeled HQ image 130 is an image at a resolution of 7680×4320, then the labeled HQ image 130 can be downsampled to produce a $HQ_1$ image 510a that can be an image at a resolution of 1280×720, a $HQ_2$ image 510b that can be an image at a resolution of 2048×1080, and a $HQ_3$ image 510c can be an image at a resolution of 3840×2160.

The $IEM_1$ 500a receives the $LQ_1$ image 505 and $HQ_1$ image 510a and generates the $RB_1$ 560a and $HQ''_1$ image 570a. As shown in FIG. 6, the output of the IEM 500 (e.g., 500a) can be provided as input to the next IEM 500 (e.g., 500b). In one embodiment, the $HQ''_1$ image 570a outputted by the $IEM_1$ 500a can be provided as input to the $IEM_2$ 500b. Here, the $HQ''_1$ image 570a can be of a lower image quality in comparison to the target $HQ_2$ image 510b which also serves as an input to the $IEM_2$ 500b. For example, the $HQ''_1$ image 570a can be at a resolution of 1280×720 whereas the target $HQ_2$ 510b is at a resolution of 2048×1080.

In some embodiments, the $HQ''_1$ 570a is processed prior to being provided as input to the $IEM_2$ 500b. As an example, a downsampling module (not shown) can downsample the $HQ''_1$ 570a to a desired scale, such as a desired resolution. Therefore, instead of having a particular image enhancement module 500 for every pair of LQ image and HQ image, the enhanced encoder system 150 can downsample an image to a desired quality that an image enhancement module 500 can handle. For example, if a particular image enhancement module 500 processes a LQ image at 1280×720 resolution and a HQ image at 2048×1080 resolution, then a LQ image at 1280×960 resolution can be downsampled to 1280×720 and provided as input to that image enhancement module 500.

The $IEM_2$ 500b receives the $HQ''_1$ 570a (or a further processed version of $HQ''_1$ 570a) and the $HQ_2$ 510b image and generates the $RB_2$ 560b and predicted HQ image ($HQ''_2$) 570b. In various embodiments, the $HQ''_2$ 570b can be provided as input to the next $IEM_3$ 500c. In some embodiments, the $HQ''_2$ 570b can be processed prior to being provided as input to the next $IEM_3$ 500c.

As shown in FIG. 6, the $IEM_3$ 500c is the final image enhancement module in the cascade. In various embodiments, the $IEM_3$ 500c can output the $RB_3$ 560c without further generating a predicted HQ image. The architecture of the final IEM in the cascade can differ from preceding IEM in the cascade. For example, briefly referring to FIG. 5, the final IEM in the cascade need not include the RDM 550 or the RM 580.

The enhanced encoder system 150 can store each of the residual bitstreams (e.g., $RB_1$ 560a, $RB_2$ 560b, and $RB_3$ 560c) generated by the IEMs 500. When the enhanced encoder system 150 detects that an image enhancement system 110 can receive additional bitstreams, the enhanced encoder system 150 can send one or more of the residual bitstreams to the image enhancement system 110. For example, the enhanced encoder system 150 can send $RB_1$ 560a by itself, send both $RB_1$ 560a and $RB_2$ 560b, or send all three of $RB_1$ 560a, $RB_2$ 560b, and $RB_3$ 560c.

Cascading Residual Decoder Modules 240 for Predicting a High Quality Image

Figure 7:
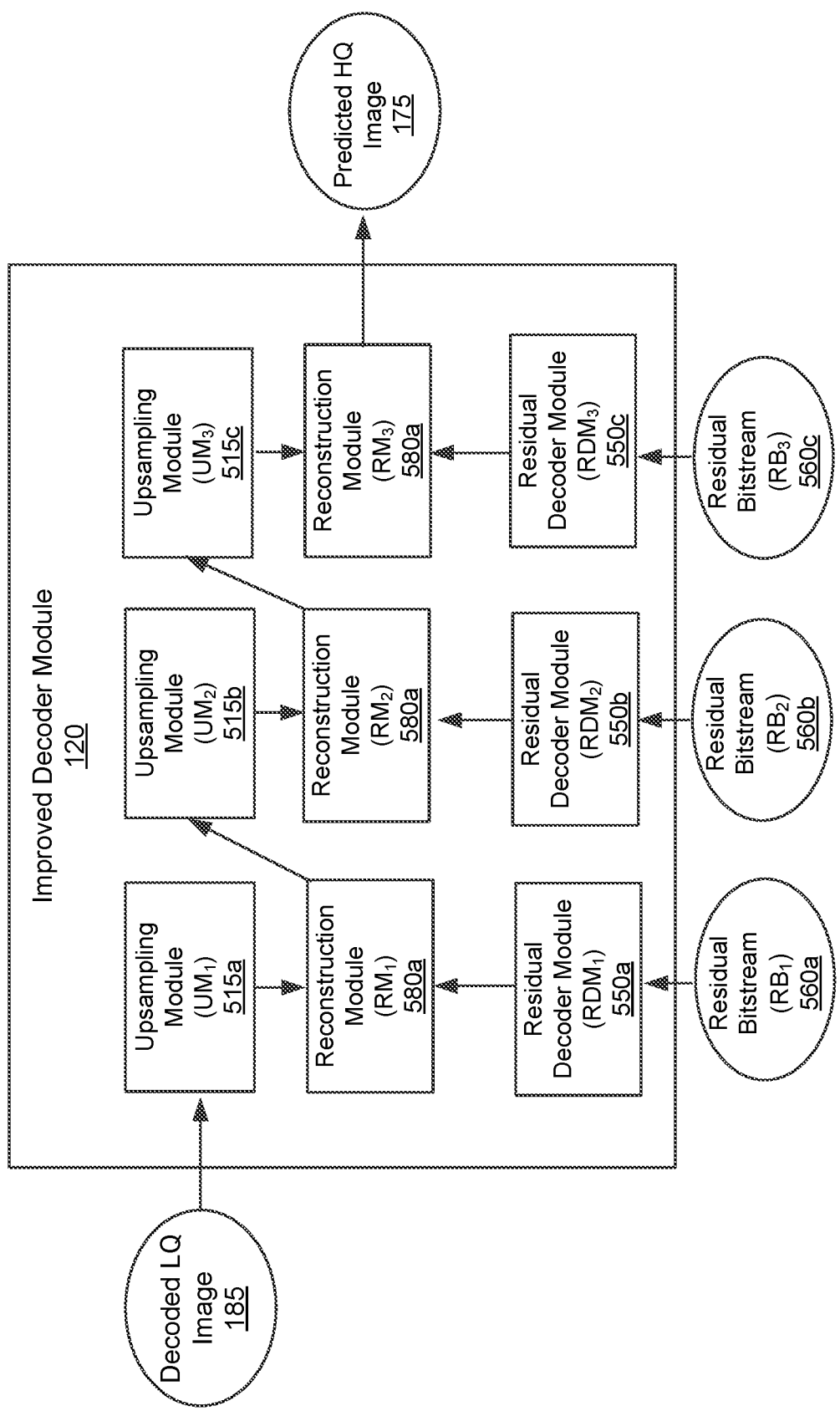
FIG. 7 is a flow diagram for predicting a high quality image by the improved decoder module of the image enhancement system, in accordance with an embodiment.

FIG. 7 is a flow diagram for predicting a high quality image by the improved decoder module 120 using multiple residual bitstreams 560, in accordance with an embodiment. Generally, the improved decoder module 120 improves the quality of the decoded LQ image 185 received from the standard decoder module 115 (see FIG. 1) to generate the predicted HQ image 175.

The improved decoder module 120 employs one or more upsampling modules (e.g., $UM_1$ 515a, $UM_2$ 515b, and $UM_3$ 515c), one or more residual decoder modules (e.g., $RDM_1$ 550a, $RDM_2$ 550b, and $RDM_3$ 550c), and one or more reconstruction modules (e.g., $RM_1$ 580a, $RM_2$ 580b, and $RM_3$ 580c) to generate the predicted HQ image 175. Each of the upsampling modules 515, residual decoder modules 550, and reconstruction modules 580 can correspond to a level and can perform functions that are similar to the functions performed by the corresponding modules in the image enhancement module 500, as described above in relation to FIG. 5.

The improved decoder module 120 receives the decoded LQ image 185. Although not shown, the improved decoder module 120 may include an interface that receives the decoded LQ image 185 and provides the image to the upsampling module ($UM_1$) 515a. The LQ image 185 is the first level LQ image ($LQ_1$) 505 (see FIG. 6) that the enhanced encoder model 150 processes. Together, the $UM_1$ 515a, $RDM_1$ 550a, and $RM_1$ 580a at the first level upsamples and improves the decoded LQ image 185. For example, if the decoded LQ image 185 is at a resolution of 720×480, then the $UM_1$ 515a, $RDM_1$ 550a, and $RM_1$ 580a can generate a higher quality image at 1280×720 resolution.

More specifically, the $UM_1$ 515a upsamples the decoded LQ image 185 by applying a trained upsampling model. The $RDM_1$ 550a receives a first residual bitstream ($RB_1$) 560a which represents a residual encoded by the $IEM_1$ 500a. To decode $RB_1$ 560a, the $RDM_1$ 550a performs an entropy decoding process to generate the tensor for the residual and applies the tensor as input to a decoder model. The decoder model outputs the predicted residual. The $RM_1$ 580a reconstructs an image by combining the upsampled image from $UM_1$ 515a and the predicted residual from $RDM_1$ 550a. Here, the reconstructed image represents an image of a higher quality in comparison to the decoded LQ image 185 and furthermore, represents an improvement in comparison to the upsampled image generated by the $UM_1$ 515a. The reconstructed image generated by $RM_1$ 580a can be provided as input to the upsampling module corresponding to the next level (e.g., $UM_2$ 515b).

Next, the $UM_2$ 515b, $RDM_2$ 550b, and $RM_2$ 580b at the second level further upsamples and improves the higher quality image using the additional image information in the second residual bitstream $RB_2$ 560b. For example, if the higher quality image is at 1280×720 resolution, then the $UM_2$ 515b, $RDM_2$ 550b, and $RM_2$ 580b can generate an image at a higher scale (e.g., 2048×1080 resolution). This image at the next scale is provided as input to the upsampling module corresponding to the next level (e.g., $UM_2$ 515c).

The $UM_3$ 515c, $RDM_3$ 550c, and $RM_3$ 580c at the third level further upsamples and improves the image at the next scale using the additional image information in the third residual bitstream $RB_3$ 560c. For example, if the image at the next scale is at 2048×1080 resolution, then the $UM_3$ 515c, $RDM_3$ 550c, and $RM_3$ 580c generates the predicted HQ image 175 which can be at a higher resolution of 3840×2160. Although FIG. 7 depicts three levels that correspond to the three upsampling modules 515, three reconstruction modules 580, and three residual decoder modules 550, the improved decoder module 120 can include additional or fewer modules to handle the additional or fewer residual bitstreams 560 received by the improved decoder module 120.

Flow Process for Generating a Residual Bitstream

Figure 8A:
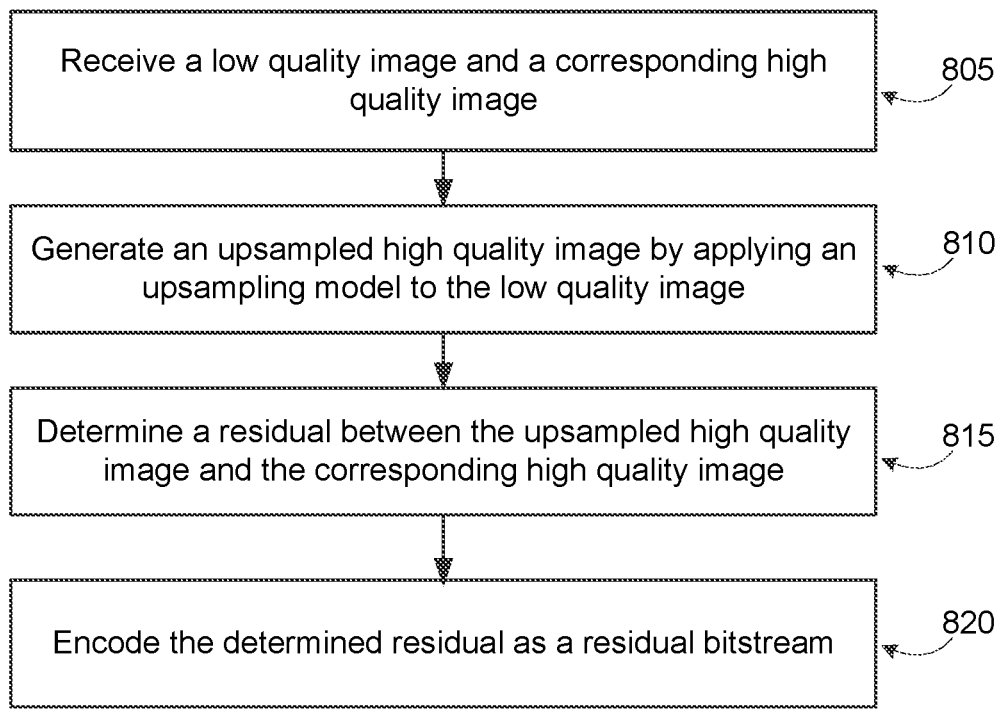
FIG. 8A is a flowchart for the generation of a residual bitstream, in accordance with an embodiment.

FIG. 8A is a flowchart for the generation of a residual bitstream, in accordance with an embodiment. The enhanced encoder system 150 receives 805 a low quality image and a corresponding high quality image. The enhanced encoder system 150 generates 810 an upsampled high quality image by applying an upsampling model to the low quality image. For example, the upsampling model can be a convolutional neural network that is trained to predict an image of a higher resolution given an image of a lower resolution. The enhanced encoder system 150 determines 815 a residual representing a difference between the upsampled high quality image and the received corresponding high quality image. The enhanced encoder system 150 encodes 820 the residual as a residual bitstream. In various embodiments, the enhanced encoder system 150 applies a trained encoder model to generate a compressed representation (e.g., tensor) of the residual and further performs an entropy coding process on the compressed representation to generate the residual bitstream.

Flow Process for Training Machine Learning Models

Figure 8B:
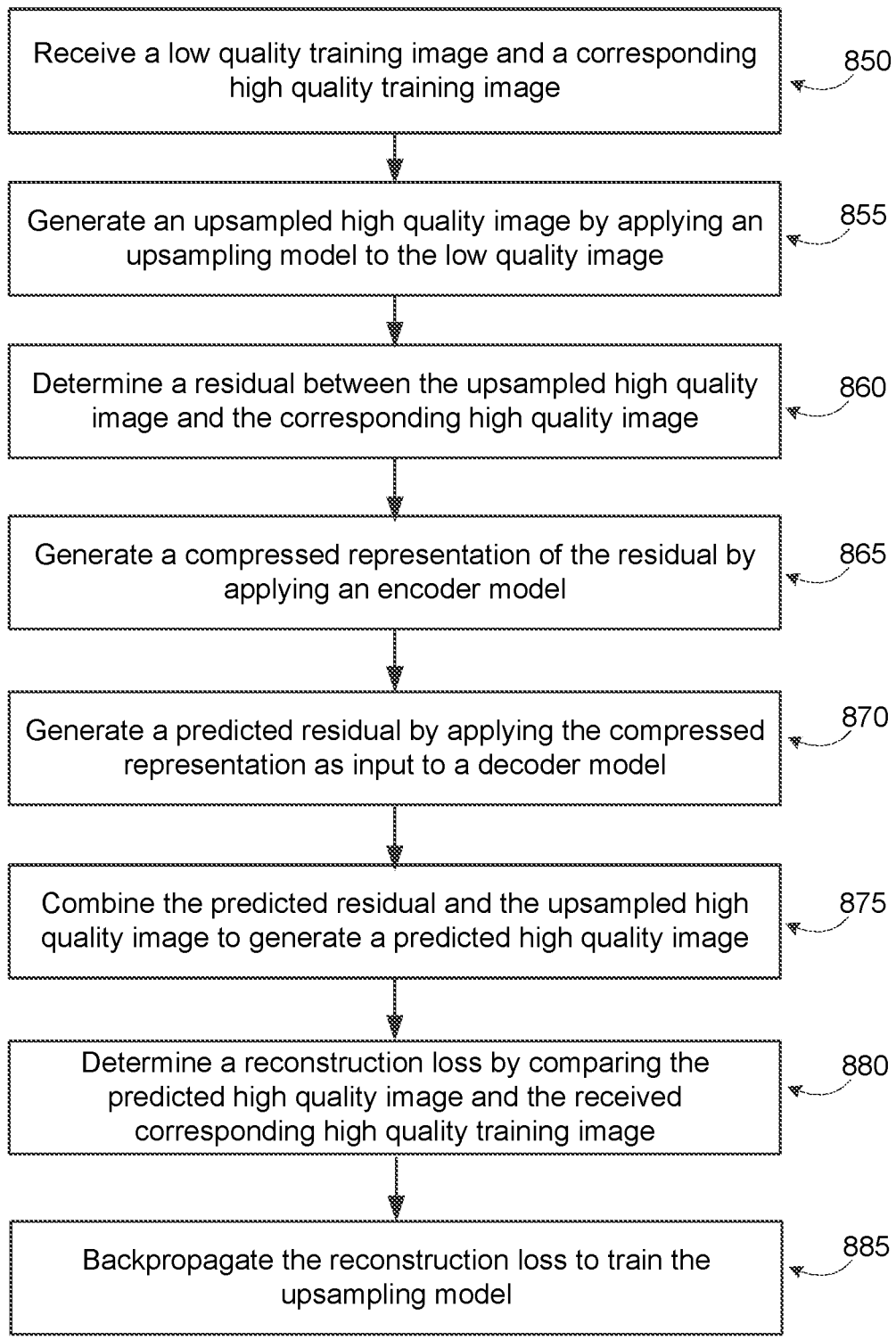
FIG. 8B is a flowchart for training the models that are applied for generating the residual bitstream, in accordance with an embodiment.

FIG. 8B is a flowchart for training one or more models that are applied for generating the residual bitstream, in accordance with an embodiment. Specifically, the enhanced encoder system 150 receives 850 a low resolution training image and a corresponding high resolution training image. The enhanced encoder system 150 generates 855 an upsampled high quality image by applying an upsampling model to the low quality training image. The enhanced encoder system 150 determines 860 a residual between the upsampled high quality image and the previously received corresponding high quality training image. In some embodiments, the residual can be backpropagated to train the upsampling model. The enhanced encoder system 150 generates 865 a compressed representation (e.g., tensor) of the residual by applying an encoder model.

The enhanced encoder system 150 generates 870 a predicted residual by applying the compressed representation as input to a decoder model. Here, the enhanced encoder system 150 can apply a trained decoder model to perform the decoding. The enhanced encoder system 150 combines 875 the predicted residual with the upsampled high quality image that was previously generated at step 855 by applying the upsampling model. The combination of the predicted residual and the upsampled high quality image is a predicted high quality image that incorporates the additional image information included in the predicted residual.

The enhanced encoder system 150 determines 880 a reconstruction loss by comparing the predicted high quality image and the corresponding high quality training image received at step 850. The reconstruction loss is backpropagated 885 to train the upsampling model. In various embodiments, the reconstruction loss is also backpropagated to train an encoding model (e.g., model applied at step 865) and a decoding model (e.g., model applied at step 870). Therefore, the upsampling model, encoding model, and decoding model can be jointly trained.

Flow Process for Generating a High Resolution Image

Figure 9:
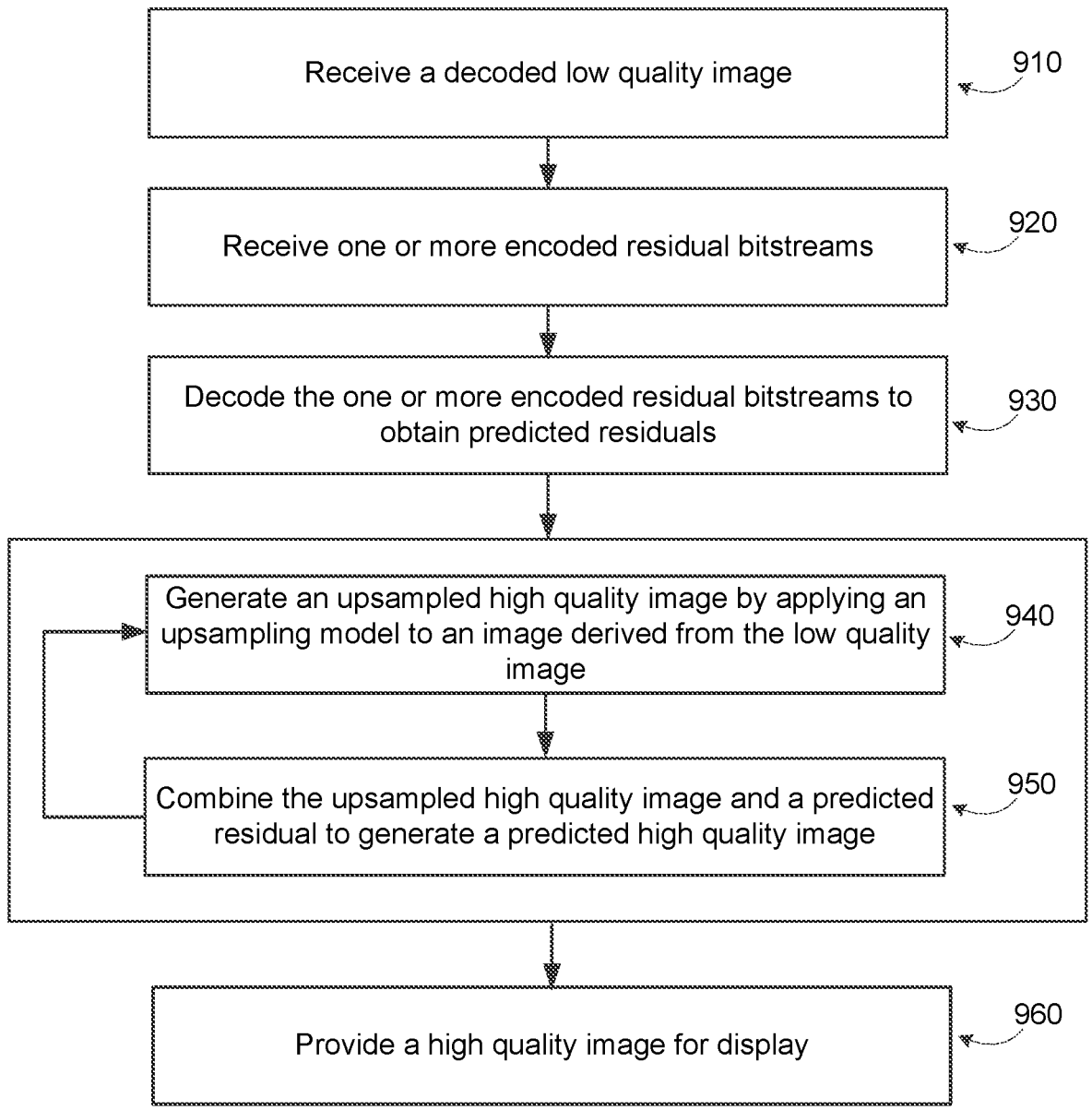
FIG. 9 is a flowchart for predicting the high resolution image, in accordance with an embodiment.

FIG. 9 is a flowchart for predicting a high resolution image, in accordance with an embodiment. Generally, the flow process shown in FIG. 9 is performed by an image enhancement system 110 that has bandwidth availability to receive residual bitstreams to be used to improve a high quality image.

The image enhancement system 110 receives 910 a decoded low quality image and further receives 920 one or more encoded residual bitstreams. For each of the one or more encoded residual bitstreams, the image enhancement system 110 decodes 930 the residual bitstream to obtain a predicted residual. Here, the image enhancement system 110 can perform an entroy decoding process on each residual bitstream to obtain a tensor. The image enhancement system 110 applies each tensor as input to a different decoder model to obtain the predicted residual. Each predicted residual represents additional image information at a particular image scale (e.g., a particular image resolution) such that the image enhancement system 110 can improve an image at that particular image scale.

The image enhancement system 110 can perform an iterative process to improve the quality of the decoded low quality image. At a first iteration, the image enhancement system 110 generates 940 an upsampled high quality image by applying an upsampling model to the low quality image. The image enhancement system 110 combines 950 the upsampled high quality image with a predicted residual that corresponds to the scale of the upsampled high quality image. This process generates a predicted high quality image. The image enhancement system 110 can use the predicted high quality image as input to the next iteration in the process. Thus, the predicted high quality image can be upsampled 940 and further combined 950 with another predicted residual to produce an image of higher quality. Following the iterative process of improving the quality of an image, the image enhancement system 110 can provide 960 the final high quality image for display.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of making an image enhancement system, the method comprising:
   obtaining training content comprising a plurality of examples, each example comprising a low resolution version of an image and a high resolution version of the image;
   for a compression model including an upsampling portion, an encoding portion, and a decoding portion, for each of the examples, repeatedly backpropagating one or more error terms obtained from a loss function to update a set of parameters of the compression model, wherein the one or more error terms comprises:
      a reconstruction loss indicating a dissimilarity between the high resolution version of the image and reconstructed content, wherein the reconstructed content is generated by:
         applying the upsampling portion to the low resolution version of the image to generate an upsampled image,
         determining a residual between the upsampled image and the high resolution image,
         applying the encoding portion to the residual to generate a tensor for the residual, and applying the decoding portion to the tensor to generate a predicted residual, and
         combining the predicted residual with the upsampled image to obtain the reconstructed content; and
   stopping the backpropagation after the loss function satisfies a predetermined criteria; and
   storing parameters of the upsampling portion, the encoding portion, and the decoding portion as parameters of the compression model.

2. The method of claim 1, wherein the one or more error terms further comprises:
   a codelength regularization loss indicating a cost of code lengths for compressed codes generated by applying an entropy coding technique to the tensor for the residual, wherein the codelength regularization loss is determined based on magnitudes of elements of the tensor.

3. The method of claim 1, wherein the one or more error terms further comprises a residual loss indicating a magnitude of the residual.

4. The method of claim 1, wherein the residual represents a pixel-by-pixel difference between the upsampled high quality image and the target high quality image.

5. The method of claim 1, wherein the parameters of the encoder portion and the parameters of the decoder portion are tied.

6. An encoder stored on a non-transitory computer readable storage medium, wherein the encoder is manufactured by a process comprising:
   obtaining training content comprising a plurality of examples, each example comprising a low resolution version of an image and a high resolution version of the image;
   for a compression model including an upsampling portion, an encoding portion, and a decoding portion, for each of the examples, repeatedly backpropagating one or more error terms obtained from a loss function to update a set of parameters of the compression model, wherein the one or more error terms comprises:
      a reconstruction loss indicating a dissimilarity between the high resolution version of the image and reconstructed content, wherein the reconstructed content is generated by:
         applying the upsampling portion to the low resolution version of the image to generate an upsampled image,
         determining a residual between the upsampled image and the high resolution image,
         applying the encoding portion to the residual to generate a tensor for the residual, and applying the decoding portion to the tensor to generate a predicted residual, and
         combining the predicted residual with the upsampled image to obtain the reconstructed content; and
   stopping the backpropagation after the loss function satisfies a predetermined criteria; and
   storing parameters of the upsampling portion and the encoding portion as parameters of the encoder.

7. The encoder of claim 6, wherein the one or more error terms further comprises:
   a codelength regularization loss indicating a cost of code lengths for compressed codes generated by applying an entropy coding technique to the tensor for the residual, wherein the codelength regularization loss is determined based on magnitudes of elements of the tensor.

8. The encoder of claim 6, wherein the one or more error terms further comprises a residual loss indicating a magnitude of the residual, wherein the residual loss is used to update parameters of the encoder portion of the compression model.

9. The encoder of claim 6, wherein the residual represents a pixel-by-pixel difference between the upsampled high quality image and the target high quality image.

10. The encoder of claim 6, wherein the parameters of the encoder portion and the parameters of the decoder portion are tied.

11. A decoder stored on a non-transitory computer readable storage medium, wherein the decoder is manufactured by a process comprising:
   obtaining training content comprising a plurality of examples, each example comprising a low resolution version of an image and a high resolution version of the image;

for a compression model including an upsampling portion, an encoding portion, and a decoding portion, for each of the examples, repeatedly backpropagating one or more error terms obtained from a loss function to update a set of parameters of the compression model, wherein the one or more error terms comprises:
  a reconstruction loss indicating a dissimilarity between the high resolution version of the image and reconstructed content, wherein the reconstructed content is generated by:
    applying the upsampling portion to the low resolution version of the image to generate an upsampled image,
    determining a residual between the upsampled image and the high resolution image,
    applying the encoding portion to the residual to generate a tensor for the residual, and applying the decoding portion to the tensor to generate a predicted residual, and
    combining the predicted residual with the upsampled image to obtain the reconstructed content; and
  stopping the backpropagation after the loss function satisfies a predetermined criteria; and
  storing parameters of the upsampling portion and the decoding portion as parameters of the decoder.

12. The decoder of claim 11, wherein the one or more error terms further comprises:
  a codelength regularization loss indicating a cost of code lengths for compressed codes generated by applying an entropy coding technique to the tensor for the residual, wherein the codelength regularization loss is determined based on magnitudes of elements of the tensor.

13. The decoder of claim 11, wherein the one or more error terms further comprises a residual loss indicating a magnitude of the residual, wherein the residual loss is used to update parameters of the encoder portion of the compression model.

14. The decoder of claim 11, wherein the residual represents a pixel-by-pixel difference between the upsampled high quality image and the target high quality image.

15. The decoder of claim 11, wherein the parameters of the encoder portion and the parameters of the decoder portion are tied.

16. A system for enhancing encoded content, the system comprising:
  an enhanced encoder system comprising:
    an interface for receiving a low resolution version of an image and a high resolution version of the image;
    an upsampling module coupled to the interface to upsample the low resolution version of the image by applying a machine-learned upsampling model to generate an upsampled image;
    a residual generation module coupled to the interface and the upsampling module to generate a residual between the upsampled image and either the high resolution version of the image or an image derived from the high resolution version of the image by determining a difference between the upsampled image and either the high resolution version of the image or the image derived from the high resolution version of the image;
    an encoder module coupled to the residual generation module to generate a tensor for the residual by applying a machine-learned encoder model to the residual; and
    an entropy coder coupled to receive the tensor for the residual and generate a bitstream by performing an entropy encoding process; and
  an image enhancement system comprising:
    an interface for receiving an encoded version of the low resolution version of the image, and to receive the bitstream from the enhanced encoder system;
    a standard decoder module coupled to the interface to decode the encoded version of the low resolution version of the image by applying rules to the encoded version of the low resolution version of the image according to a standard;
    an upsampling module coupled to the standard decoder to upsample the decoded low resolution version of the image by applying the machine-learned upsampling model;
    an entropy decoder coupled to receive the bitstream and generate the tensor of the residual by performing an entropy decoding process;
    a decoder module coupled to receive the tensor of the residual and to generate a predicted residual by applying a machine-learned decoder model to the residual; and
    a reconstruction module coupled to combine the predicted residual with the upsampled decoded low resolution version of the image to generate a predicted high resolution version of the image.

17. The system of claim 16, wherein the enhanced encoder system further comprises:
  a decoder module coupled to the encoder module to generate a predicted residual by applying a machine-learned decoder model to the tensor for the residual outputted by the machine-learned encoder model;
  a reconstruction module coupled to the decoder module of the enhanced encoder system to generate a predicted high quality version of the image by combining the predicted residual with the upsampled image generated by the upsampling module of the enhanced encoder system; and
  an additional upsampling module coupled to the reconstruction module of the enhanced encoder system to upsample the predicted high quality version of the image by applying an additional machine-learned upsampling model;
  an additional residual generation module coupled to the additional upsampling module to generate an additional residual between the predicted high quality version of the image and a second high resolution version of the image by determining a difference between the predicted high quality version of the image and the second high resolution version of the image; and
  an additional encoder module coupled to the additional residual generation module to generate a tensor for the additional residual by applying a second machine-learned encoder model to the additional residual.

18. The system of claim 17, wherein the enhanced encoder system further comprises:
  a downsampling module coupled to the interface to downsample the high resolution version of the image, wherein the image derived from the high resolution version of the image and the second high resolution version of the image are each downsampled versions of the high resolution version of the image outputted by the downsampling module.

19. The system of claim 17, wherein the image enhancement system further comprises:

the additional upsampling module coupled to the reconstruction module of the image enhancement system to upsample the predicted high resolution version of the image;

an additional entropy decoder coupled to receive the additional bitstream and generate the tensor for the additional residual by performing an entropy decoding process;

an additional decoder module coupled to receive the tensor for the additional residual and to generate an additional predicted residual; and a reconstruction module coupled to combine the additional predicted residual with the predicted high resolution version of the image.

20. The system of claim 16, wherein the machine-learned encoder model and the machine-learned decoder model are jointly trained.

21. An enhanced encoder system comprising
an interface for receiving a low resolution version of an image and a high resolution version of the image;

an upsampling module coupled to the interface to upsample the low resolution version of the image by applying a machine-learned upsampling model to generate an upsampled image;

a residual generation module coupled to the interface and the upsampling module to generate a residual between the upsampled image and the high resolution image by determining a difference between the upsampled image and the high resolution image; and an encoder module coupled to the residual generation module to generate a tensor for the residual by applying a machine-learned encoder model to the residual.

22. The system of claim 21, wherein the enhanced encoder system further comprises:

a decoder module coupled to the encoder module to generate a predicted residual by applying a machine-learned decoder model to the tensor for the residual outputted by the machine-learned encoder model;

a reconstruction module coupled to the decoder module of the enhanced encoder system to generate a predicted high quality version of the image by combining the predicted residual with the upsampled image generated by the upsampling module of the enhanced encoder system; and an additional upsampling module coupled to the reconstruction module of the enhanced encoder system to upsample the predicted high quality version of the image by applying an additional machine-learned upsampling model;

an additional residual generation module coupled to the additional upsampling module to generate an additional residual between the predicted high quality version of the image and a second high resolution version of the image by determining a difference between the predicted high quality version of the image and the second high resolution version of the image; and an additional encoder module coupled to the additional residual generation module to generate a tensor for the additional residual by applying a second machine-learned encoder model to the additional residual.

23. The system of claim 22, wherein the enhanced encoder system further comprises:

a downsampling module coupled to the interface to downsample the high resolution version of the image, wherein the image derived from the high resolution version of the image and the second high resolution version of the image are each downsampled versions of the high resolution version of the image.

24. An image enhancement system comprising system comprising:

an interface for receiving an encoded version of the low resolution version of the image, and to receive the bitstream from the enhanced decoder system;

a standard decoder module coupled to the interface to decode the encoded version of the low resolution version of the image by applying rules to the encoded version of the low resolution version of the image according to a standard;

an upsampling module coupled to the standard decoder to upsample the decoded low resolution version of the image by applying the machine-learned upsampling model;

an entropy decoder coupled to receive the bitstream and generate a tensor of the residual by applying an entropy decoding process;

a decoder module coupled to receive the tensor of the residual and to generate a predicted residual by applying a machine-learned decoder model to the tensor of the residual; and a reconstruction module coupled to combine the predicted residual with the upsampled decoded low resolution version of the image to generate a predicted high resolution version of the image.

25. The system of claim 24, wherein the image enhancement system further comprises:

an additional upsampling module coupled to the reconstruction module to upsample the predicted high resolution version of the image by applying an additional machine-learned upsampling model;

an additional entropy decoder coupled to receive an additional bitstream and generate a tensor for the additional residual by applying an entropy decoding process;

an additional decoder module coupled to receive the tensor for the additional residual and to generate an additional predicted residual; and a reconstruction module coupled to combine the additional predicted residual with the predicted high resolution version of the image.

26. The system of claim 17, further comprising:
an additional entropy coder coupled to receive the tensor for the additional residual and generate an additional bitstream.

27. The system of claim 21, further comprising:
an entropy coder coupled to receive the tensor for the residual and generate a bitstream.

28. The system of claim 22, further comprising:
an additional entropy coder coupled to receive the tensor for the additional residual and generate an additional bitstream.

* * * * *